US011579278B2

(12) United States Patent
Sarabandi et al.

(10) Patent No.: US 11,579,278 B2
(45) Date of Patent: Feb. 14, 2023

(54) ALL-DIRECTION HIGH-RESOLUTION SUBSURFACE IMAGING USING DISTRIBUTED MOVING TRANSCEIVERS

(71) Applicant: THE REGENTS OF THE UNIVERSITY OF MICHIGAN, Ann Arbor, MI (US)

(72) Inventors: Kamal Sarabandi, Ann Arbor, MI (US); Behzad Yektakhah, Ann Arbor, MI (US); Abdulrahman Aljurbua, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 399 days.

(21) Appl. No.: 16/910,259

(22) Filed: Jun. 24, 2020

(65) Prior Publication Data

US 2020/0400805 A1 Dec. 24, 2020

Related U.S. Application Data

(60) Provisional application No. 62/865,590, filed on Jun. 24, 2019.

(51) Int. Cl.
*G01S 13/00* (2006.01)
*G01S 13/86* (2006.01)
(Continued)

(52) U.S. Cl.
CPC ............ *G01S 13/003* (2013.01); *G01S 5/06* (2013.01); *G01S 13/32* (2013.01); *G01S 13/86* (2013.01);
(Continued)

(58) Field of Classification Search
CPC ... G01V 3/12; G01V 3/15; G01V 3/16; G01V 1/003; G01S 13/885; G01S 13/89;
(Continued)

(56) References Cited

U.S. PATENT DOCUMENTS 5,673,050 A * 9/1997 Moussally .......... G01S 13/0209
342/25 F
5,835,053 A * 11/1998 Davis .................. G01S 13/0209
342/22
(Continued)

OTHER PUBLICATIONS

W. Sun, Q. Xu, H. Zhang and Z. Yao, "Research on Detection and Visualization of Underground Pipelines," 2012 2nd International Conference on Remote Sensing, Environment and Transportation Engineering, 2012, pp. 1-4, doi: 10.1109/RSETE.2012.6260692. (Year: 2012).*

(Continued)

*Primary Examiner* — Olumide Ajibade Akonai
(74) *Attorney, Agent, or Firm* — Harness, Dickey & Pierce, P.L.C.

(57) ABSTRACT

A subsurface imaging technique using distributed sensors is introduced. Instead of monostatic transceivers employed in conventional ground penetrating radars, the proposed technique utilizes bi-static transceivers to sample the reflected signals from the ground at different positions and create a large two-dimensional aperture for high resolution subsurface imaging. The coherent processing of the samples in the proposed imaging method eliminates the need for large antenna arrays for obtaining high lateral resolution images. In addition, it eliminates the need for sampling on a grid which is a time-consuming task in imaging using ground penetration radar. Imaging results show that the method can provide high-resolution images of the buried targets using only samples of the reflected signals on a circle with the center at the transmitter location.

20 Claims, 18 Drawing Sheets

(51) Int. Cl.
*G01S 5/06* (2006.01)
*G01S 13/32* (2006.01)
*G01S 13/88* (2006.01)
*G01V 3/12* (2006.01)
*G01V 11/00* (2006.01)
*G01S 13/89* (2006.01)

(52) U.S. Cl.
CPC .............. *G01S 13/885* (2013.01); *G01S 13/89* (2013.01); *G01V 3/12* (2013.01); *G01V 11/00* (2013.01)

(58) Field of Classification Search
CPC .... G01S 13/9023; G01S 13/90; G01S 13/003; G01S 7/411; G01S 13/0209; G01S 13/878; G01S 13/34; G01S 13/9058; B64C 2201/123; H01Q 5/25
See application file for complete search history.

(56) References Cited

U.S. PATENT DOCUMENTS

| | | | |
|---|---|---|---|
| 7,755,360 B1* | 7/2010 | Martin | G01R 19/00 324/67 |
| 2010/0052969 A1* | 3/2010 | Niktash | G01S 13/89 342/54 |
| 2014/0002292 A1* | 1/2014 | Knierim | G01S 13/0209 342/22 |
| 2015/0081219 A1* | 3/2015 | Pugh | G01V 3/12 324/337 |
| 2016/0363664 A1* | 12/2016 | Mindell | G01S 7/352 |
| 2020/0116881 A1* | 4/2020 | Brown | G01V 1/306 |
| 2020/0142090 A1* | 5/2020 | Colombo | G01V 3/17 |

OTHER PUBLICATIONS

M. Grasmueck and A. Novo, "3D GPR imaging of shallow plastic pipes, tree roots, and small objects," 2016 16th International Conference on Ground Penetrating Radar (GPR), 2016, pp. 1-6, doi: 10.1109/ICGPR.2016.7572671. (Year: 2016).*

* cited by examiner

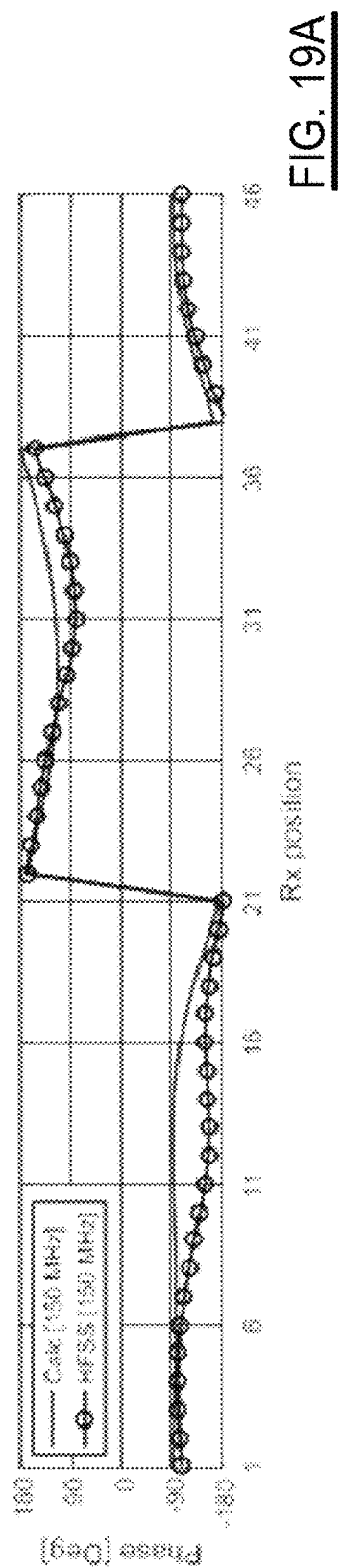
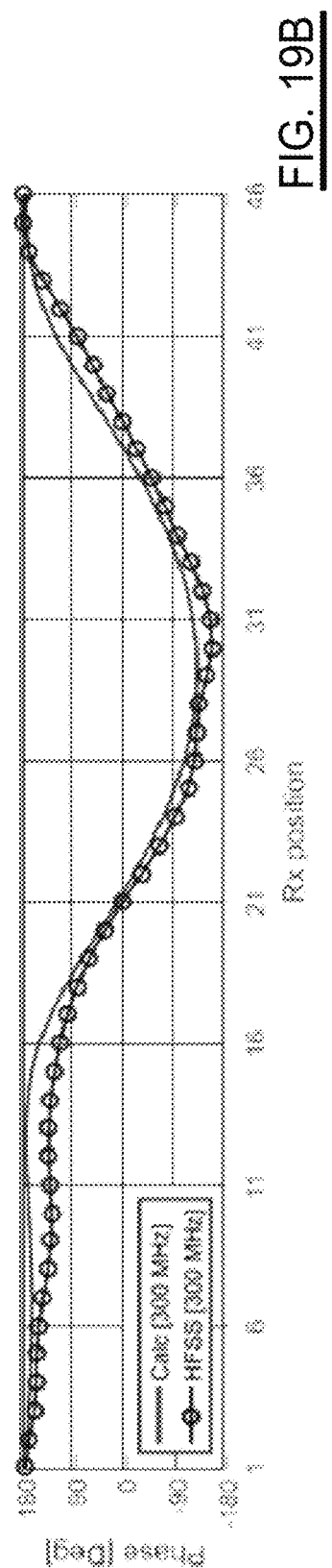
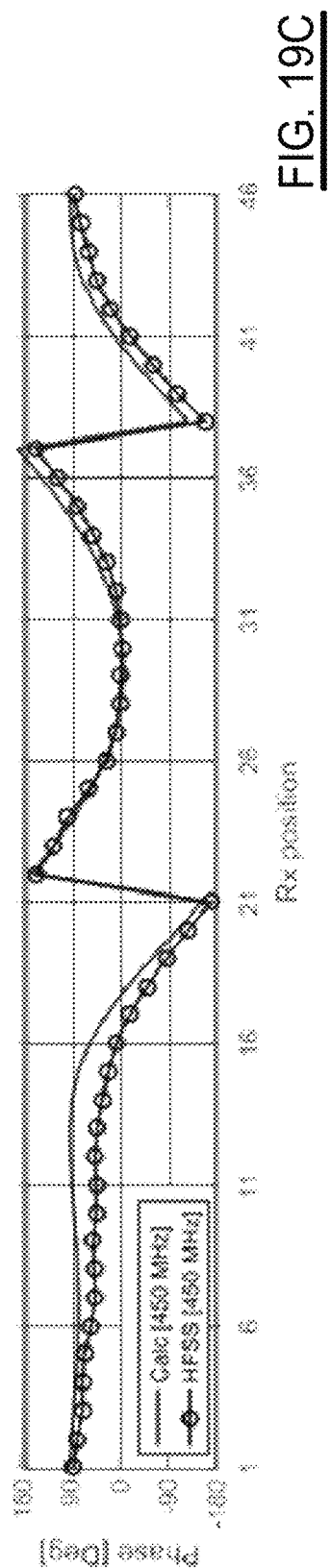
FIG. 19A
FIG. 19B
FIG. 19C

ALL-DIRECTION HIGH-RESOLUTION SUBSURFACE IMAGING USING DISTRIBUTED MOVING TRANSCEIVERS

CROSS-REFERENCE TO RELATED APPLICATIONS

This application claims the benefit of U.S. Provisional Application No. 62/865,590, filed on Jun. 24, 2019. The entire disclosure of the above application is incorporated herein by reference.

FIELD

The present disclosure relates to high resolution subsurface imaging using distributed moving transceivers.

BACKGROUND

Detection and localization of buried objects (e.g. land mines, pipelines, and cables) and subsurface features (e.g. tunnels and change in soil electrical properties due to pipeline leaks) are sought for various military, security, civilian, and industrial applications. Ground penetrating radar (GPR) is the current technology that is widely used for imaging of buried targets and subsurface features in infrastructure development, mining, town planning, archaeology, construction, industry, and ecology. GPR systems utilize a monostatic transceiver to acquire data in a uniform grid of sampling points within the area under inspection. Despite its widespread use, GPR suffers from many limitations. For example, applicability of GPR and its penetration depth are site specific and depends on soil composition and moisture. According to GPR suitability map by USDA, soil in large areas in north, east, and west of US is not suitable for inspection using conventional GPR. Limited field of view of GPR systems requires scanning all the points within the area under inspection in order to provide a complete image of the subsurface. Consequently, GPR inspection in large areas or long distances is a very time-consuming process.

Conventional GPR systems also suffer from poor lateral resolution meaning that they are not able to resolve closely spaced targets. GPR systems have limited sensitivity and cannot detect small targets or certain targets that are buried deep. To enhance underground imaging resolution, large antenna arrays must be used that limits mobility and increases cost of the system. GPR systems must comply with the power regulations mandated by authorities. This sets a limit on the maximum penetration depth of GPR system. The low resolution of the images and appearance of spurious images require trained individuals to interpret the radar data. These limitations reduce the applicability and reliability of GPR.

Applications of subsurface imaging include but are not limited to: transportation of oil, gas, and hazardous materials using pipelines: localization of old pipelines and pipeline leaks over large areas and deeply buried pipelines is of great interest for many industries including construction and oil and gas industries; detection of mines and unexploded ordnance (UXO) that require high lateral resolution imaging and operation in wide range of soil moisture and composition and depth; and detection of deeply submerged features such as perimeter breaches tunnels that is required in security operations.

A subsurface imaging method has been developed to address the aforementioned limitations of conventional GPR systems. Based on synthetic aperture radar (SAR) imaging, the proposed method has a large field of view meaning that it requires acquiring data at small number of points within the area under inspection to provide a complete 3D map of subsurface in a short period of time. Coherent processing of data points results in a high lateral resolution that make it simple to interpret the radar data. The system achieves high resolution and significantly higher sensitivity while maintains high mobility for the system. The high mobility transmitter and receiver can be mounted on ground robots or drones for automated imaging of hazardous large areas (such as mine fields) or long distances (such as pipelines).

This section provides background information related to the present disclosure which is not necessarily prior art.

SUMMARY

This section provides a general summary of the disclosure, and is not a comprehensive disclosure of its full scope or all of its features.

A method is provided for subsurface imaging. The method includes: transmitting an ultra-wideband (UWB) signal into the ground by at least one transmitter; moving a receiver in a predetermined pattern around the transmitter and along the top surface of the ground; receiving, by the receiver, a signal scattered by an object in the ground at a series of sampling points along the predetermined pattern; determining relative position of the transmitter to the at least one receiver at each sampling point in the series of sampling points; and generating an image of the object from the signals received at each sampling point and corresponding relative position of the transmitter to the at least one receiver at each sampling point.

In one embodiment, the UWB signal has a frequency in range of 150-450 MHz and the receivers move along a series of almost concentric circular paths with different diameters around the transmitter. The image of the object is preferably generated using a frequency-domain backprojection method.

In another embodiment, multiple transmitters are used simultaneously using OFDM waveforms and receivers are equipped with circuitry capable of receiving multiple OFDM signals simultaneously. This will improve detection and signal to noise ratio.

In another embodiment, the UWB signal is transmitted into the ground at a different frequency by each of a plurality of different transmitters. At the receiver, a fast Fourier transform is applied to the received signals.

In one aspect, the subsurface imaging technique is tailored to detect pipelines. The location of a pipeline can be determined by: a) selecting a possible pipeline orientation, where the possible pipeline orientation is expressed as a depth under the ground, a lateral distance from the transmitter and an angle of a longitudinal axis of the pipeline with respect to the global coordinate system; b) for each sampling point in the series of sampling points, find a point along the longitudinal axis of the pipeline where an incident angle between the longitudinal axis of the pipeline and a line connecting the point to the transmitter is equal to a reflection angle between the longitudinal axis pipeline and a line connecting the point and the receiver; c) for each sampling point in the series of sampling points, determining a scattering point on the pipeline using the reflection angle; d) for each sampling point in the series of sampling points, calculating a signal path length between the transmitter and the at least one receiver; e) coherently adding signals received at each of the sampling points in the series of sampling points; and repeating steps a)-e) for a plurality of possible pipelines orientations, depths, and distances to the transmitter in the imaging area. A particular pipeline orientation, depth, and distance from the transmitter in the imaging area is identified as a pipeline when the coherent sum is larger than a specified threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 19A-19C are graphs showing phase comparison results for the pipeline detection scheme.

Corresponding reference numerals indicate corresponding parts throughout the several views of the drawings.

DETAILED DESCRIPTION

Example embodiments will now be described more fully with reference to the accompanying drawings.

Figure 1A:
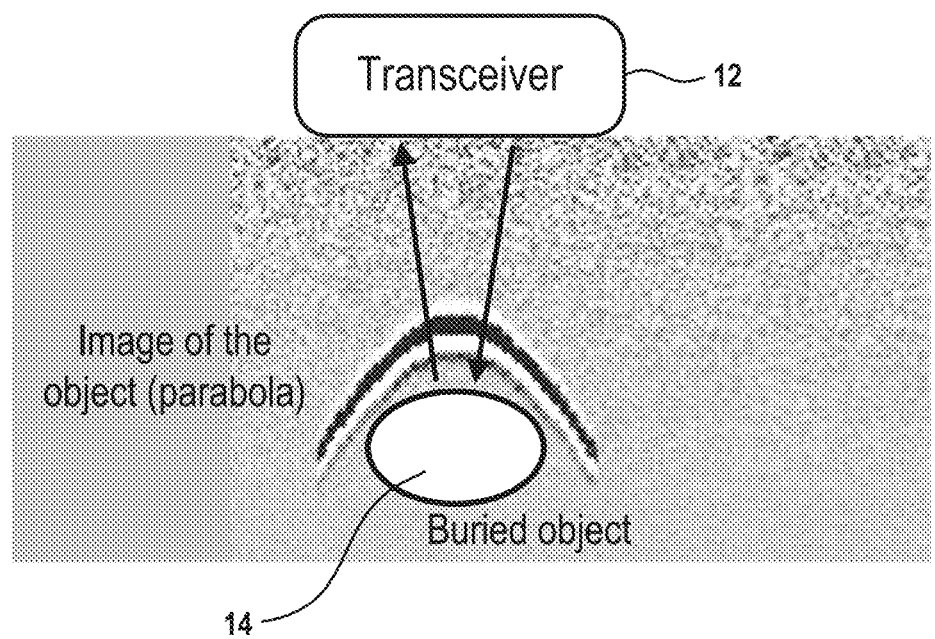
FIG. 1A is a diagram showing a monostatic transceiver in a conventional GPR system.
Figure 1B:
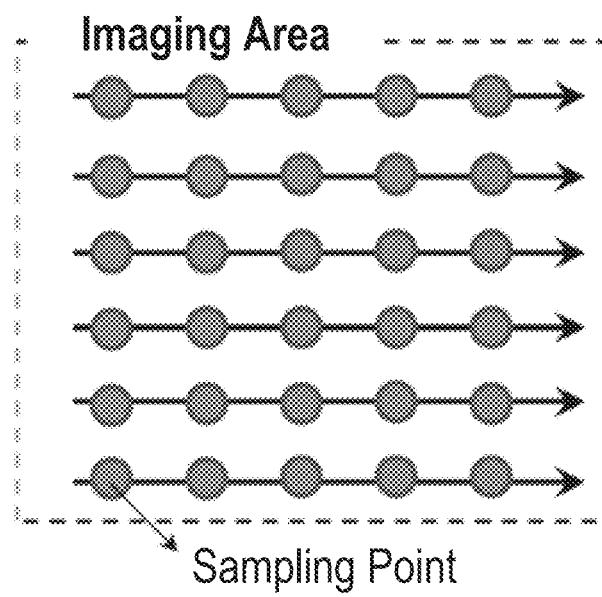
FIG. 1B is a diagram of a uniform grid of sampling points within an imaging area.

FIG. 1A shows a conventional GPR device 12 that utilizes a monostatic radar to locally illuminate the subsurface and measure the scattered fields from buried targets or any underground discontinuity. The acquired scattered fields data at each location is used to form the image at only that location. As a result, conventional GPR systems have poor lateral resolution and require moving the radar on a grid within the imaging area, illustrated in FIG. 1B, to form a complete map of the subsurface. This makes imaging of large areas a time-consuming process. The low lateral resolution of the image can be observed in FIG. 1 where the buried object 14 is imaged as a parabola extended larger than the object size. To address the low lateral resolution of GPR systems, large antenna arrays with narrow beamwidth is utilized. Such systems have low mobility and typically are mounted on a vehicle.

Figure 2:
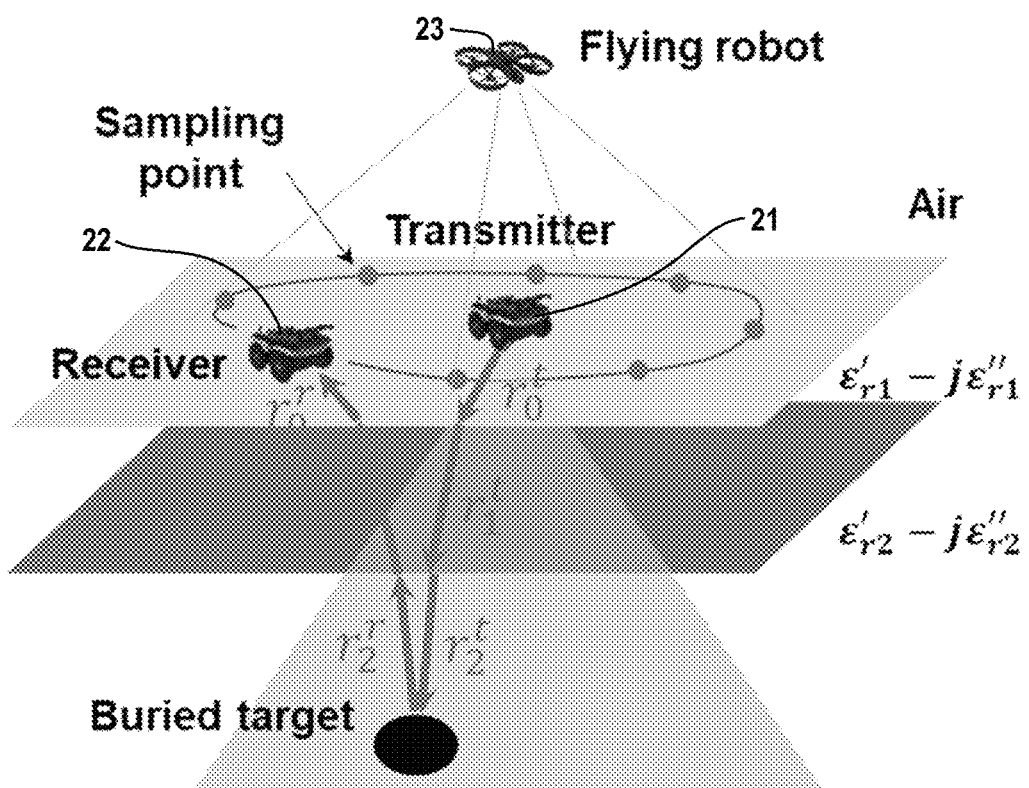
FIG. 2 is a diagram showing a transmitter and receiver arrangement in a proposed subsurface imaging system.

FIG. 2 depicts a proposed system for subsurface imaging 20. The system is comprised generally of at least one transmitter 21 and at least one receiver 22. In an example implementation, the stationary transmitter 21 is located at the center of the area under imaging (imaging area) and the receiver 22 moves around the transmitter 21 and samples the scattered fields. In this example, the receiver 22 moves on a circle around the transmitter, thereby resulting in a uniform lateral resolution in all directions. Other predetermined patterns of movement by the receive 22 also fall within the scope of this disclosure. The receiver may be further defined as a vehicle although other types of moving objects, such as a drone or aircraft, can be used as well.

Figure 3:
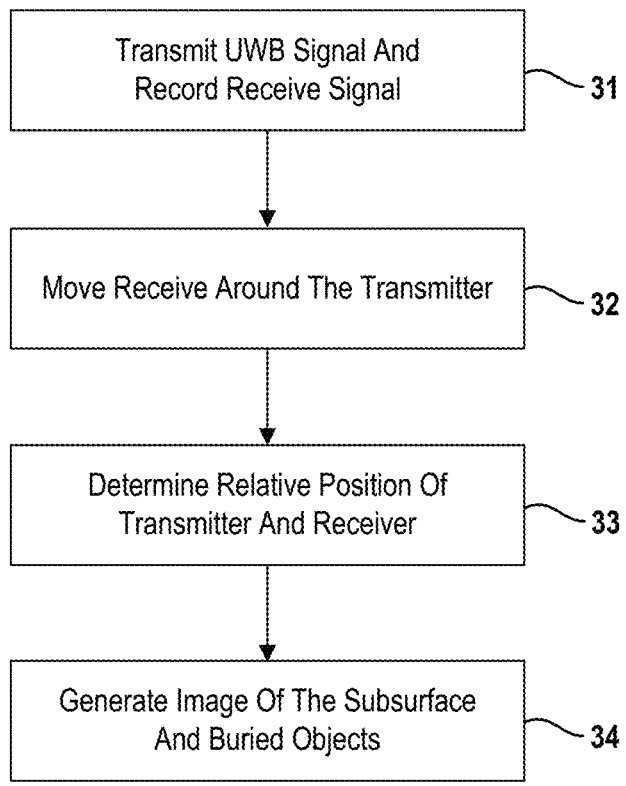
FIG. 3 is a flowchart depicting a subsurface imaging method.

FIG. 3 further illustrates the proposed method for subsurface imaging. An ultra-wideband (UWB) interrogation signal is transmitted at 31 into the ground by the transmitter, such that the transmitter is located at a center of an imaging area defined on a top surface of the ground. In one embodiment, the UWB signal is transmitted with a frequency in range of 150-450 MHz although other frequencies are contemplated by this disclosure.

At least one receiver is moved at 32 in a predetermined pattern around the transmitter and along the top surface of the ground. In one example, the receiver is moved in a series of almost concentric circles at different diameters around the transmitter. While moving and at different sampling points along the predetermined pattern, the receiver receives signals scattered by an object in the ground.

Concurrently, the relative position of the transmitter to the one receiver is determined at 33. Lastly, an image of the object is generated at 34 by an image processor. The image is generated from the signals received at each sampling point along with a corresponding relative position of the transmitter to the at least one receiver at each sampling point. The image processor may be onboard the receiver or at location remote from the receiver.

Assuming a stepped frequency continuous wave (SFCW) radar is utilized for acquiring samples of the scattered fields at N frequency steps and M locations, the image at different subsurface points is obtained by applying back-projection as follows $$I(r) = \sum_{m=1}^{M} \sum_{n=1}^{N} S_{mn} \Pi_{l=0}^{L} e^{jIm(\gamma_{nl})(r_l^t + r_l^r)} \quad (1)$$

where L indicates the number of soil layers (layer 0 indicates air), $\gamma_{nl}$ is the complex propagation constant for the lth layer at nth frequency step and $S_{mn}$ is the frequency response obtained at nth frequency step and mth sampling point. As illustrated in FIG. 2, $r_l^t$ and $r_l^r$ are the distances that constant phase planes travel inside the lth layer from the transmitter to the image point and from the image point to mth sampling point, respectively. Knowing the relative position of transmitter and receiver for each sampling point and complex permittivity of soil layers, $r_l^{t,r}$s can be calculated using a ray-tracing method. In the proposed method, a flying robot 23 taking photos of transmitter 21 and receiver 22 or, alternatively, a LIDAR mounted on the transmitter can be used to detect relative location of the transmitter and receiver.

Figure 4:
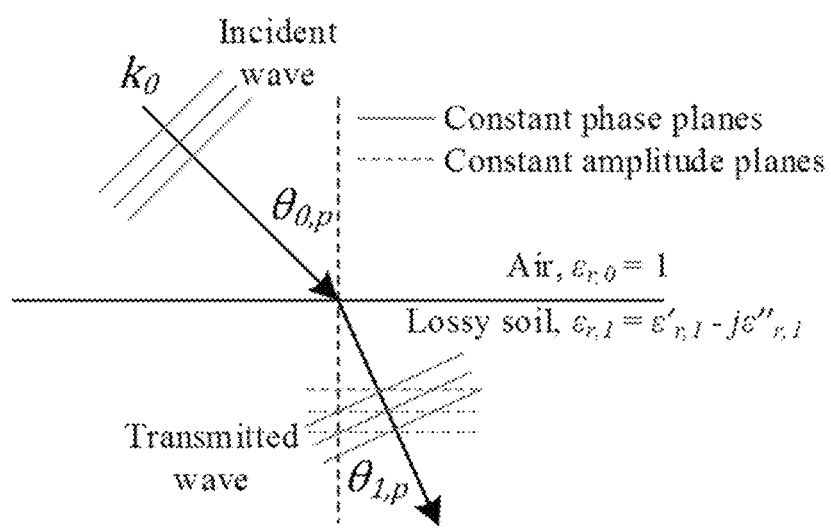
FIG. 4 is a diagram showing a transmission at air-ground interface.

Assuming the air-ground interface is illuminated by a plane wave with angle of incidence of $\theta_{p,0}$ as shown in FIG. 4, the direction of propagation for the constant phase planes in the lower medium (one-layer lossy soil), $\theta_{p,1}$, is calculated by $$\theta_{p,1} = \tan^{-1}\left(\frac{k_0 \sin\theta_{p,0}}{\text{Im}(\gamma_1 \cos\theta_1)}\right), \quad (2)$$

where $k_0$ is the phase propagation constant in air and $\gamma_1$ is the complex propagation constant of the lower medium. $k_0$ and $\gamma_1$ are defined by $$k_0 = \frac{2\pi}{\lambda_0} \quad (3a)$$

$$\lambda_1 = j\frac{2\pi}{\lambda_0}\sqrt{\varepsilon_{r,1}}. \quad (3b)$$

where $\lambda_0$ is the free-space wavelength and $\varepsilon_1$ is the complex relative permittivity of the lower medium.
In equation (2), $\cos\theta_1$ is a complex value and is calculated by $$\cos\theta_1 = \sqrt{1 - \frac{1}{\varepsilon_{r,1}}\sin^2\theta_{0,p}} \quad (4)$$

In practice, the permittivity profile of soil is unknown and must be estimated. This can be done by assuming a permittivity profile for the soil and then applying an optimization algorithm modifying the permittivity profile to sharpen the image.

Figure 5A:
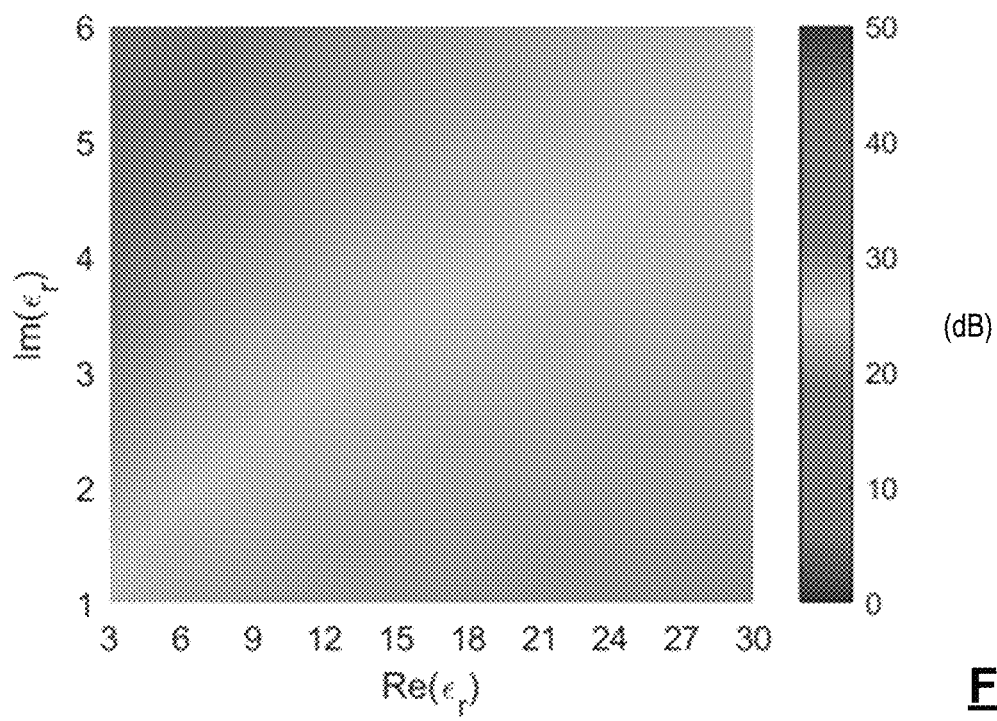
FIG. 5A is a graph showing attenuation in one-layer soil at depth of 1 m for different values of real and imaginary parts of soil permittivity at 100 MHz.
Figure 5B:
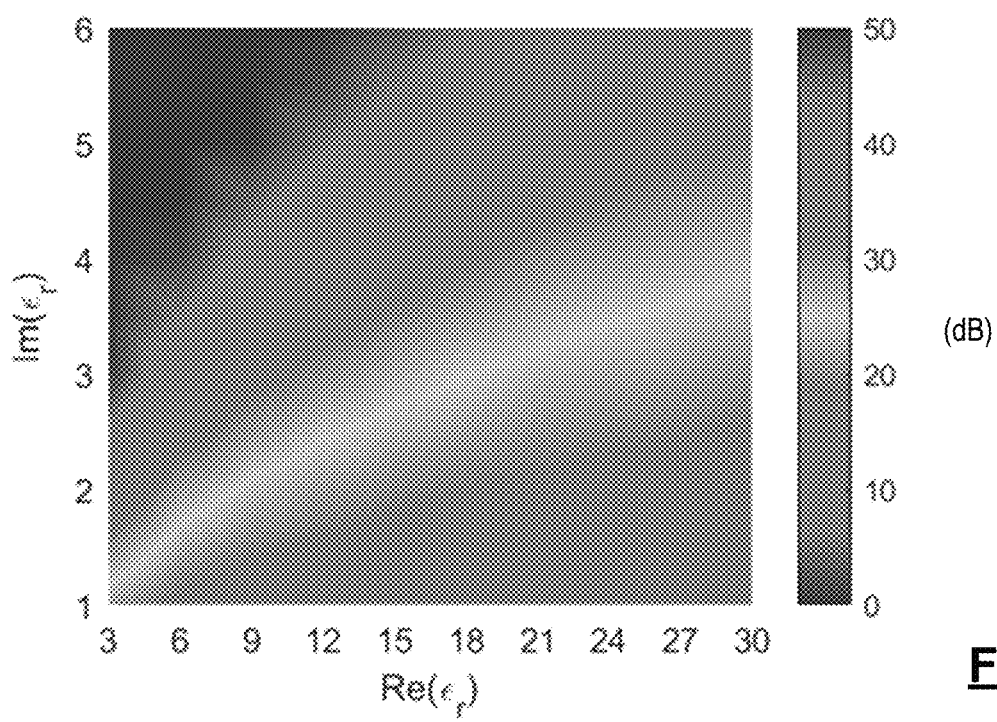
FIG. 5B is a graph showing attenuation in one-layer soil at depth of 1 m for different values of real and imaginary parts of soil permittivity at 500 MHz.

To achieve high range resolution, frequency bandwidth of the transmitted signal must be large. However, due to the large attenuation in soil at high frequencies, operation at high frequencies to increase the bandwidth is not feasible. In subsurface imaging, the maximum frequency of operation must be determined according to the maximum buried depth of targets. To investigate the effect of soil complex permittivity on the amplitude of signals traveling to the maximum depth, a one-layer soil model (half-space) and a horizontal infinitesimal dipole (transmitter) is considered. FIGS. 5A and 5B show the one-way attenuation at depth of 1 m (a typical buried depth for pipelines) at 100 MHz and 500 MHz, respectively, for different values of the real and imaginary parts of soil permittivity. The attenuation is defined as the ratio of the amplitude of the signal at depth of 1 m (normal incidence) to the amplitude of the signal at air-ground interface while the soil layer is replaced by air. With this definition and the selected source, calculated attenuation includes loss in the soil as well as transmission coefficient at air-ground interface and path loss due to the spread of power. It can be observed that increasing the operation frequency increases the attenuation in soil. However, for a wide range of soil types and soil moisture content, the attenuation at 1 m is less than 35 dB for frequencies up to 500 MHz (resulting maximum two-way path loss of 70 dB). For the application of pipeline localization and leak detection, the frequency range 150-450 MHz is selected for image formation. It is noted that reducing the minimum frequency to increase the bandwidth is not possible since it requires utilizing large antennas which is not practical. It is readily understood that the frequency range may vary depending upon the application.

Figure 6A:
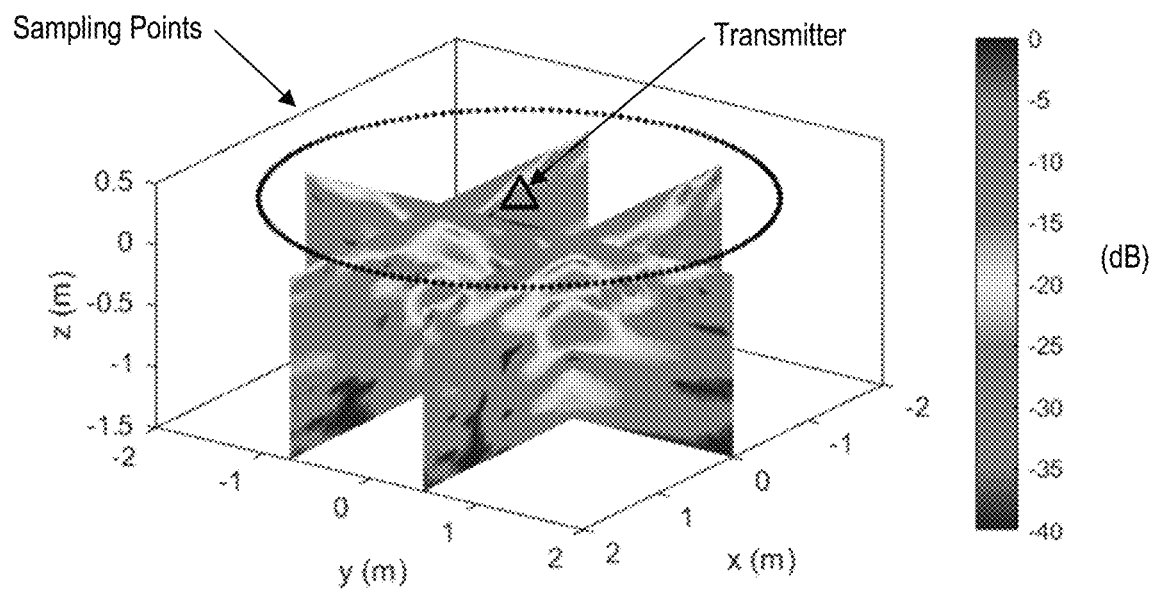
FIG. 6A shows simulation results for two metallic spheres with the centers at (0, 0.5 m, −0.9 m) and (0, −0.75 m, −0.9 m) using the proposed subsurface imaging system with one transmitter.
Figure 6B:
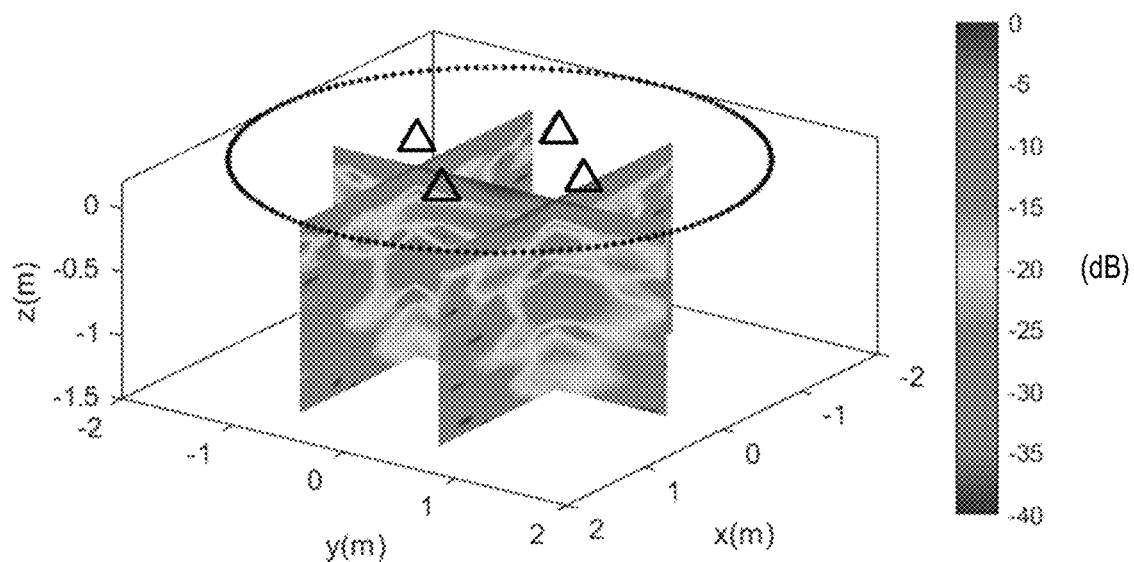
FIG. 6B shows simulation results for two metallic spheres with the centers at (0, 0.5 m, −0.9 m) and (0, −0.75 m, −0.9 m) using the proposed subsurface imaging system with the transmitter at four different locations.

Assuming two spheres with radius of 10 cm and centers at (x, y, z)=(0, 0.5 m, −0.9 m) and (0, −0.75 m, −0.9 m) are buried in half space z<0 with complex permittivity of 3-j0.06 (dry soil) and scattered fields are sampled at 90 points equally distributed on a circle with radius of 2 m, FIG. 6 shows the effect of illuminating the subsurface from multiple locations. FIG. 6A shows the image formed while the subsurface is illuminated by one transmitter at the center and FIG. 6B shows the image while the subsurface is illuminated from four different positions. Using the scattered fields in the range 150-450 MHz, the spheres are clearly imaged in both cases at the depth of 0.8 cm which is the location of the most top part of the spheres. However, the objects are imaged with better contrast and less background noise in FIG. 6B where the subsurface is illuminated from different positions. In the system realizing the proposed subsurface imaging method, the scattered field data obtained for different locations for the transmitter are used for image formation. Each transmitter location requires separate measurement of scattered fields at sampling points that increases the time required for data collection. To reduce the data collection time in a multi-transmitter system, a technique similar to orthogonal frequency division multiplexing (OFDM) is utilized to separate the scattered fields due to each transmitter while all the transmitters operate simultaneously.

Figure 7:
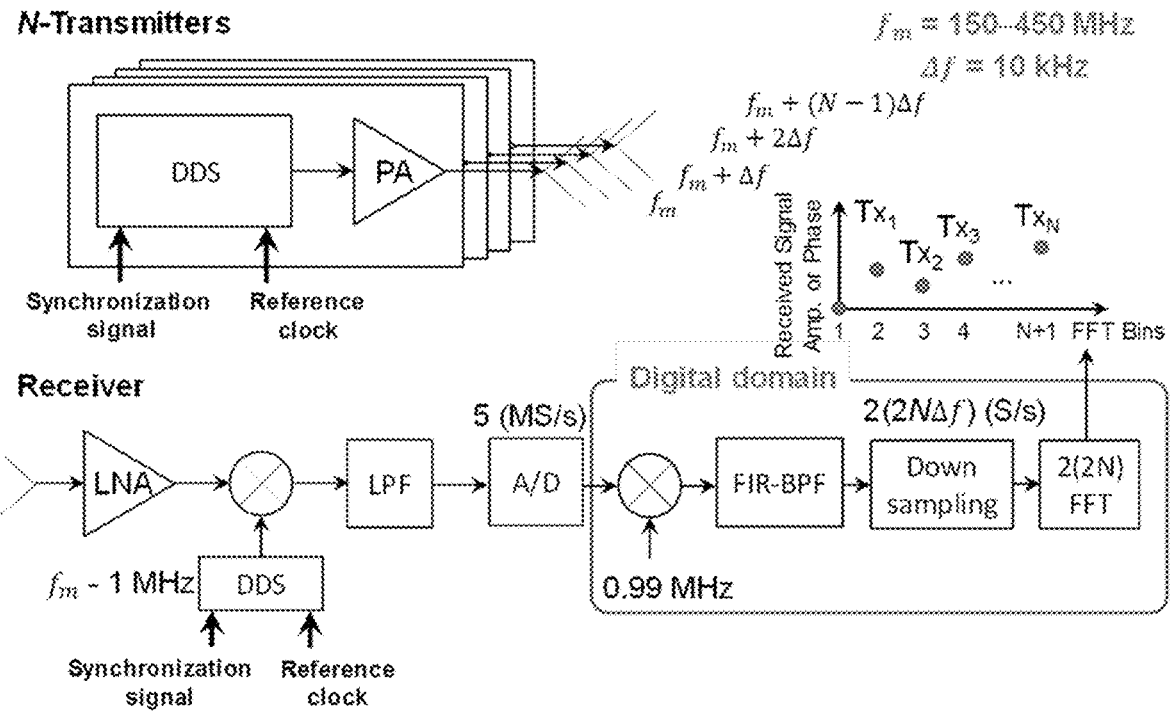
FIG. 7 is a block diagram of a multi-transmitter imaging system.

FIG. 7 shows a block diagram of the imaging radar with N transmitters. In each transmitter, a DDS generates a stepped frequency signal in the range 150-450 MHz with 5 MHz steps resulting in aliasing-free range of 30 m in free space. At each frequency step, the frequency of transmitters output signal is separated by Δf. At mth frequency step, the output frequency of the nth transmitter is $f_m+(n-1)\Delta f$ ($n=1, 2, 3, \ldots, N$). At receiver, signals from the transmitters are down-converted by an LO signal with frequency of $f_m-\Delta f$ at mth frequency step, resulting IF signals with frequency of $\Delta f, 2\Delta f, 3\Delta f, \ldots,$ and $N\Delta f$. These signals are sampled by an analog to digital converter (A/D) with sampling rate of $2(2N\Delta f)$. Applying fast Fourier transform (FFT) with $2(2N)$ points to $2(2N)$ samples results in extraction of the phase and amplitude of the receive signal due to each transmitter as illustrated in FIG. 7. The resulting (n+1)th FFT sample provides the phase and amplitude of the received signal due to nth transmitter.

According to FIG. 7, down-conversion is performed in two steps in analog (down-conversion of the received signal by $f_m-1$ MHz) and digital domain (down-conversion by 0.99 MHz) to avoid degradation of signals due to flicker noise in analog domain.

To synchronize the transmitters and receiver, reference clock signal for DDS and command for start of frequency sweep are transmitted to transmitters and receivers. Delay between start of frequency sweep at transmitters and receiver and delay in start of A/D sampling are two sources of error in phase measurements. The former introduces a shift in range of detected targets and the latter introduces a constant phase shift in the measured phase of the scattered signals at different frequencies. Using the direct signal from transmitter to receiver and knowing the distance between the transmitter and receiver, the shift in the range of targets can be detected and removed as discussed below.

For system realization, the stepped frequency signal is generated by a DDS that generates a chirp signal with large time steps (i.e. at each frequency step, frequency of the generated chirp signal remains constant for a large period of time). In this case, the phase shift due to A/D start time error remains constant for all frequency samples. This makes error correction possible.

The received signal at mth frequency sample in a system employing N transmitters is modeled by $$S_r^m = \sum_{n=1}^{N} A_{mn} e^{j\phi_{mn}} e^{j2\pi(f_m+(n-1)\Delta f)(t-t_{d,n})} \quad (5)$$

where $A_m$ and $\phi_m$ are the amplitude and phase of the received scattered signal due to the nth transmitter and $t_{d,n}$ is the time delay in start of the chirp signal at the nth transmitter. After two steps of down-conversion (equivalent to down-conversion by $f_m$) and low pass filtering, the IF signal is $$S_{IF} = \sum_{n=1}^{N} A_{mn} e^{j\phi_{mn}} e^{j2\pi((n-1)\Delta f)t} \times e^{-j2\pi(f_m+(n-1)\Delta f)t_{d,n}} \times e^{j2\pi(f_m)t_{d,LO}}. \quad (6)$$

In (6), $t_{d,LO}$ is the delay in start of the frequency sweep at the receiver. Assuming an A/D with sampling rate of $F_s$ (samples/s) starts sampling of the IF signal $t_{AD}$ seconds after start of frequency sweep at the receiver, samples of the IF signal is $$S_{IF}(k) = S_{IF}(t)\big|_{t=\frac{k}{F_s}+t_{d,LO}+t_{AD}} \quad (7)$$

-continued
$$= \sum_{n=1}^{N} A_{mn} e^{j\phi_{mn}} e^{j2\pi((n-1)\Delta f)\left(\frac{k}{F_s}+t_{d,LO}+t_{AD}\right)} \times$$
$$e^{-j2\pi(f_m+(n-1)\Delta f)t_{d,n}} \times e^{j2\pi(f_m)t_{d,LO}}.$$

The extracted signal at nth OFDM channel ($=S_{mn}$=signal due to nth transmitter at mth frequency sample) is $$S_{mn}=(A_{mn}e^{j\phi_{mn}})(e^{-j2\pi((n-1)\Delta f)(t_{d,n}-t_{d,LO}-t_{AD})})$$
$$(e^{-j2\pi(f_m)(t_{d,n}-t_{d,LO})}) \quad (8)$$

The first term is actual response. The second term is a constant phase shift that does not affect the image due to each pair of transmitter and receiver but prevents coherent addition of images for all pairs of transmitter and receiver in SAR imaging. The phase shift in the third term is linearly increased with frequency and is equivalent to a shift in the range of target ($r_{shift}$)

$$e^{-j2\pi(f_m)(t_{d,n}-t_{d,LO})} = e^{-j2\pi(f_m)(2r_{shift})/c_0} \quad (9a)$$

$$r_{shift} = \frac{(t_{d,n}-t_{d,LO})c_0}{2} \quad (9b)$$

For correction of the shift in the range in the image formed for nth pair of transmitter and sampling point, first, the image is calculated using back-projection and $S_{mn}$s ($m=1, 2, \ldots, M$, where M is the number of frequency steps). In the image, the first peak is the signal received from the transmitter. The difference between the actual range to the transmitter and the detected one in the image is $r_{shift}$. After determining $r_{shift}$, to remove the shift in the signal received from the nth transmitter, $$S_{mn}^{shifted} = \quad (10)$$
$$S_{mn} \cdot e^{\frac{j2\pi(f_m)(2r_{shift})}{c_0}} = (A_{mn}e^{j\phi_{mn}})\left(e^{-j2\pi((n-1)\Delta f)(t_{d,n}-t_{d,LO}-t_{AD})}\right)$$

must be calculated.

To determine and remove the second term in (10), the image is formed at the location of transmitter using back-projection and $S_{mn}^{shifted}$s. The remaining phase in the image of the transmitter is an estimation of the second term in (10). Denoting the remaining phase by $\varphi_n$, the corrected $S_{mn}$ is calculated by $$S_{mn}^{corrected}=S_{mn}^{shifted}e^{-j\varphi_n} \quad (11)$$

$S_{mn}^{corrected}$'s are used for image formation.

Antennas are critical components of GPR systems. In addition to typical antenna parameters such as gain and radiation pattern, dispersion, direct coupling between transmitting and receiving antennas, and radiation characteristics in proximity of the ground are other important parameters for antennas in GPR systems. Wideband operation at low frequencies and constraints on the size and weight of the antennas for mobility, make the antenna design a challenging task for achieving high range resolution for GPR systems intended for imaging of deeply buried targets. A wideband and low-profile antenna operating at frequencies below 500 MHz is designed, fabricated, and tested that enables imaging of deeply buried targets or targets buried in soil with high losses.

Figure 8:
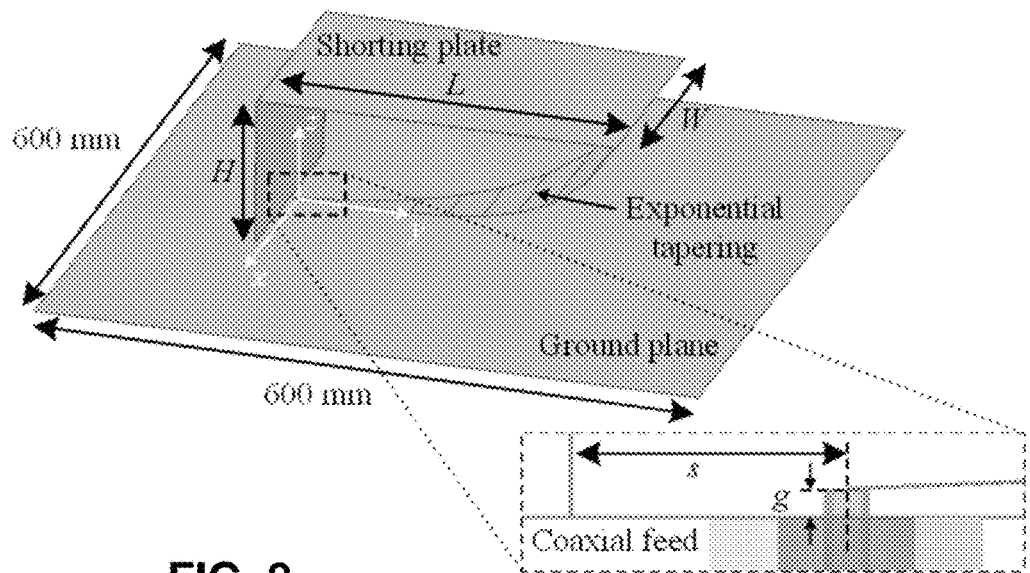
FIG. 8 depicts a modified ENVELOP antenna structure for use in the proposed subsurface imaging method.

The antenna structure is based on electrically narrow very low profile (ENVELOP) antenna. As shown in FIG. 8, ENVELOP structure is a bisected TEM horn antenna which is connected to a shorting plate at the end. An exponential tapering is used for the TEM horn section in both x and z directions to increase the impedance bandwidth. Assuming the origin is located at the feed point on the ground plane, the tapering functions is parameterized as $$x = \pm\left(\frac{W}{2}\right)\left(\frac{e^{B_x t} - 1}{e^{B_x} - 1}\right) \quad (12a)$$

$$y = (L-s)t \quad (12b)$$

$$z = (H-g)\left(\frac{e^{B_z t} - 1}{e^{B_z} - 1}\right) + g, \quad (12c)$$

where t is varied from 0 to 1 and $B_x$ and $B_z$ define the taper profile in x and z direction, respectively. With the defined profile in (12), varying $B_x$ and $B_z$ does not change the tapered section and shorting plate total height (H) and width (W). According to FIG. 8, L is the total length of the shorting plate along y, g is the gap between the tapered section and ground plane at the feed point, and s is the distance between the feed point and the shorting plate. To simplify fabrication of the antenna, a piecewise linear approximation with 10 sections is used for the tapered section as shown in FIG. 8. In this figure, the nth section's vertices (n=1, 2, 3 ... , 10) are defined by (12) while t is equal to (n−1)/10 and n/10.

Figure 9A:
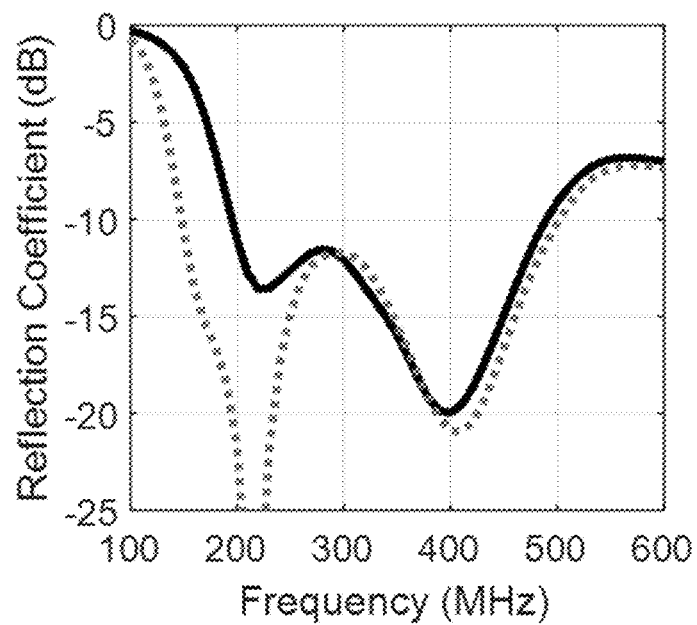
FIG. 9A is a graph showing simulation results of the reflection coefficient for the antennas in FIG. 8 (solid line) and FIG. 10 (dotted line)

The new element with exponential tapering is a modified ENVELOP element. Assuming ground plane size of 600 mm×600 mm and height (H) of 150 mm, the antenna shown in FIG. 8 is optimized for maximum −10 dB impedance bandwidth. The antenna structure is optimized in presence of dry soil with complex permittivity of 3.5-j0.0374 to provide better coupling of power from air to the ground. The optimized antenna with a single modified ENVELOP element is shown in FIG. 8. According to FIG. 9A, −10 dB impedance bandwidth of antenna covers the range 180-500 MHz. FIG. 8B shows the simulated realized gain pattern at 300 MHz in which the main lobe is skewed from the boresight direction and therefore the antenna is not perfect for GPR applications.

Figure 10:
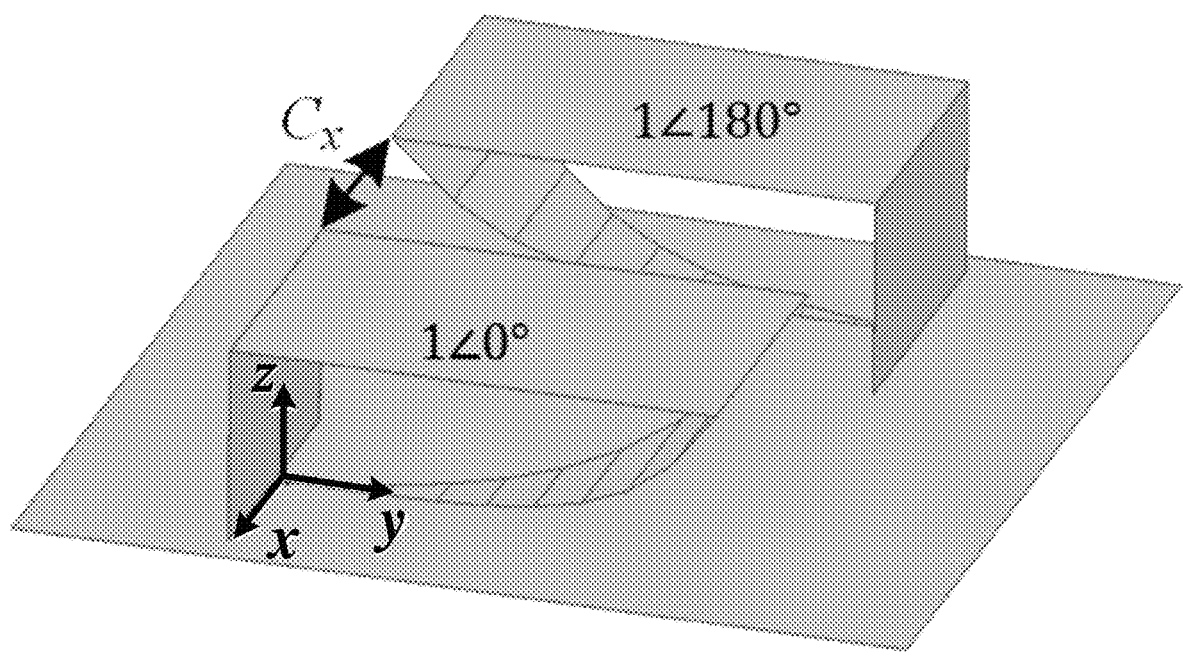
FIG. 10 depicts another two modified ENVELOP antennas for use in the proposed subsurface imaging method.

An antenna composed of two coupled modified ENVELOP antennas is designed to improve the impedance bandwidth and correct for the radiation pattern of the antenna. The geometry of the proposed antenna is shown in FIG. 10 in which the second antenna is a rotated copy (around z-axis) of the first antenna. Separation between two antennas is denoted by $C_x$. The antenna elements are excited with the same amplitude and 180° phase difference to allow for the flow of current in the same direction on both modified ENVELOP antenna elements. Depending on the separation, different levels of magnetic coupling between the two elements occurs that can be used to compensate for capacitive reactance of the input impedance and obtain better impedance matching at low frequencies. In this configuration, it is expected that the combined pattern be symmetric in yz-plane and the direction of maximum radiation be normal to the ground plane.

Figure 9B:
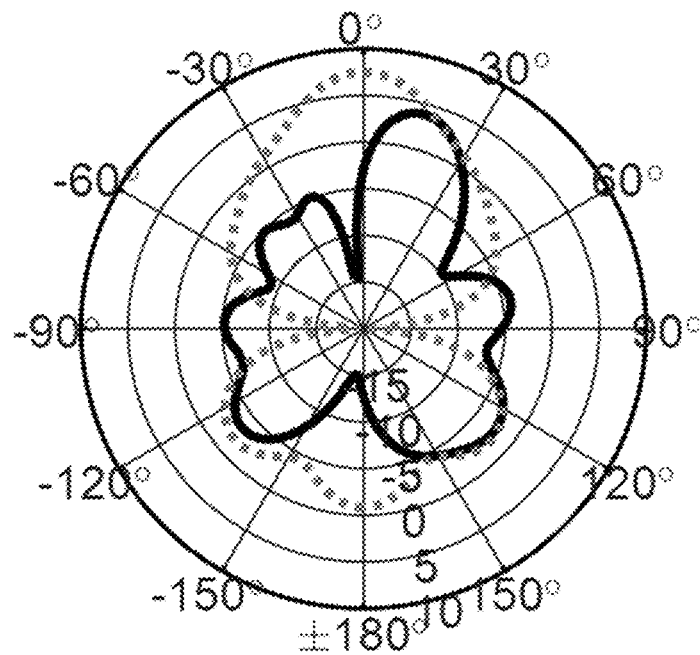
FIG. 9B is a graph showing simulation results of realized gain in yz-plane at 300 MHz for the antennas in FIG. 8 (solid line) and FIG. 10 (dotted line)

Reflection coefficient and realized gain pattern of the optimized antenna with height (H) of 150 mm (shown in FIG. 9) are shown in FIG. 9 (dotted line) which indicates improved −10-dB impedance bandwidth (140-510 MHz) and main lobe direction normal to the ground plane.

Figure 11:
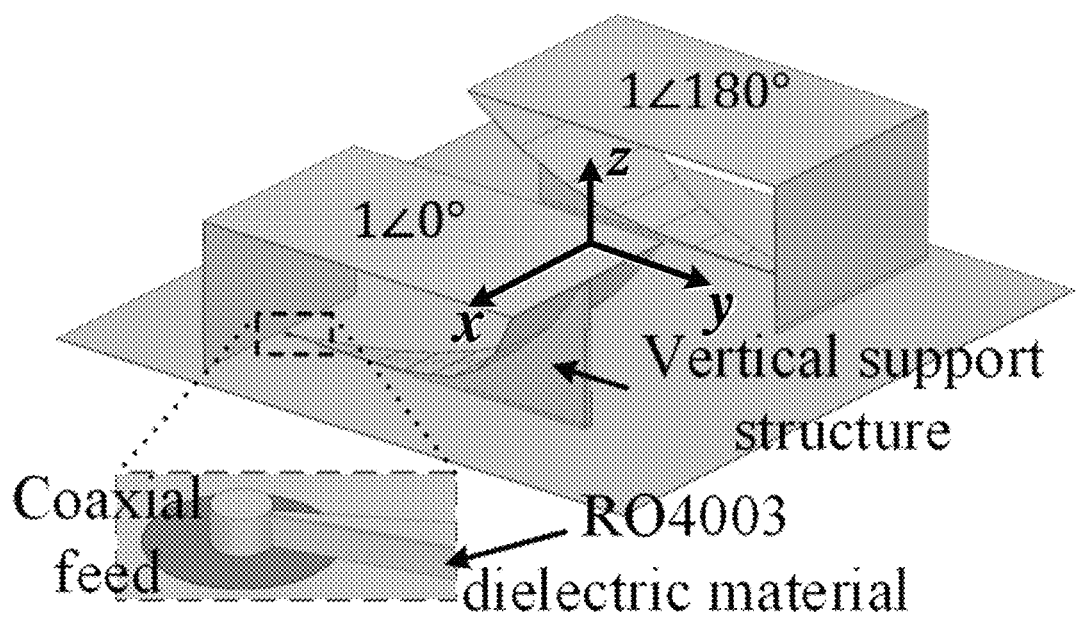
FIG. 11 depicts the modified antenna with feed.

FIG. 11 shows the modified antenna with a coaxial feed. In one example embodiment, two vertical support structures (fabricated using RO4003 substrates with the same piecewise linear profile as the tapered section) are placed at the bottom of the tapered section for mechanical stability. A 3-dB power divider with out-of-phase outputs (Mini-Circuits ZAPDJ2-5W-521S+) is utilized to feed the two ports of the antenna. Total height of the fabricated antenna excluding the connectors is 153 mm.

Figure 12A:
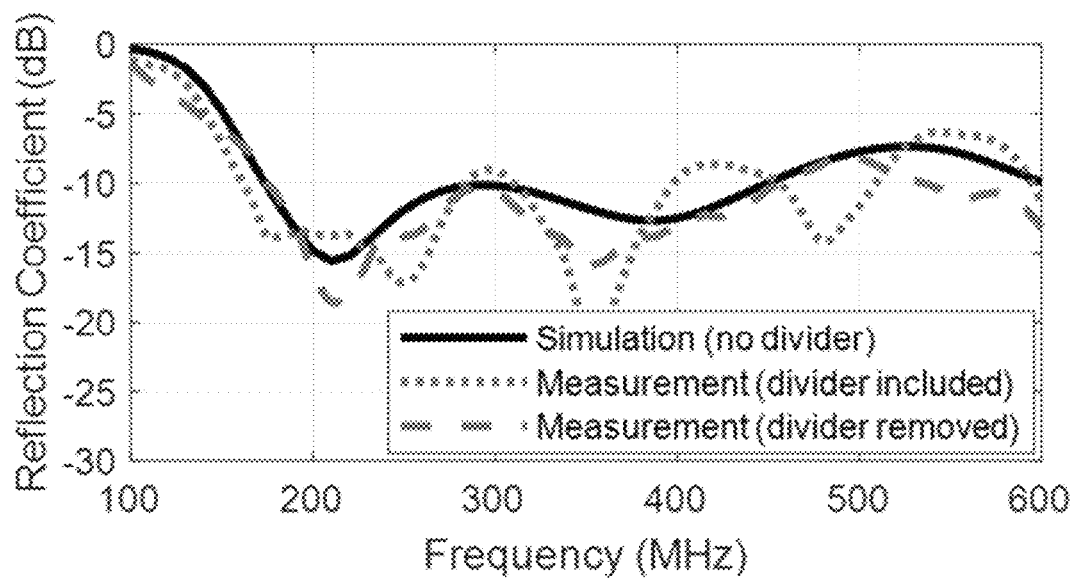
FIG. 12A is a graph depicting simulation and measurement results for reflection coefficient of the antenna in free space.
Figure 12B:
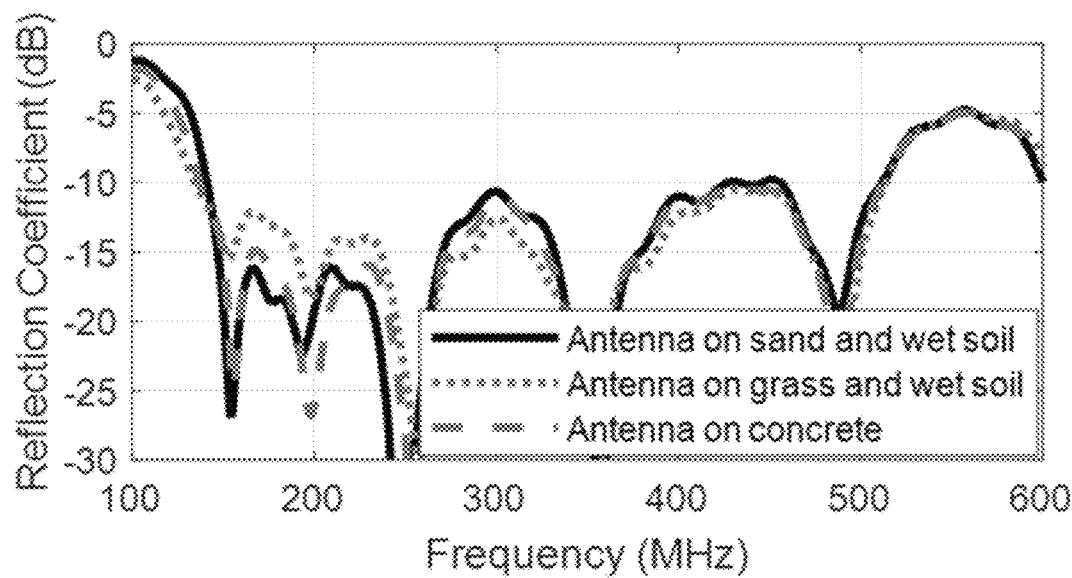
FIG. 12B is a graph depicting measured reflection coefficient for the antenna placed on the ground.

The simulated and measured reflection coefficient of the antenna in free space is shown in FIG. 12A. According to the simulation results for the antenna without divider, the reflection coefficient is less than −10 dB in the range 175-450 MHz while the antenna is placed in free space. Measurement results in FIG. 12B show that the antenna exhibits wider impedance bandwidth in proximity of the ground. In this measurement, the antenna is placed at the distance of 10 cm above concrete, wet soil covered by grass, and wet soil covered by sand. In all cases, the reflection coefficient is less than −9.5 dB over the band 140-510 MHz.

Figure 13A:
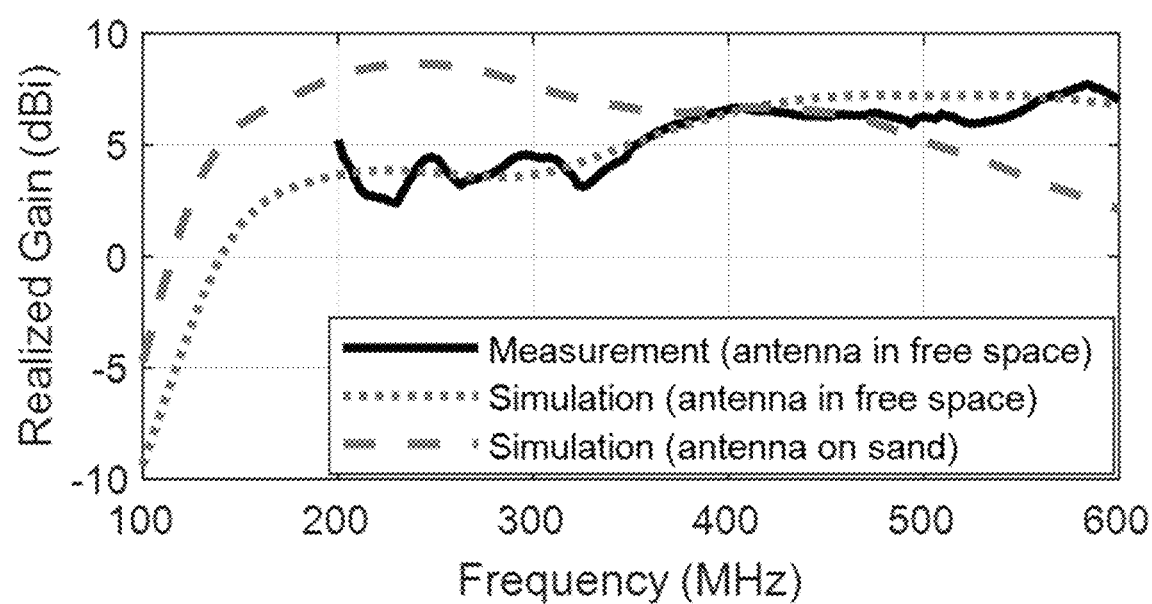
FIG. 13A is a graph showing simulated and measured realized gain of the fabricated antenna.
Figure 13B:
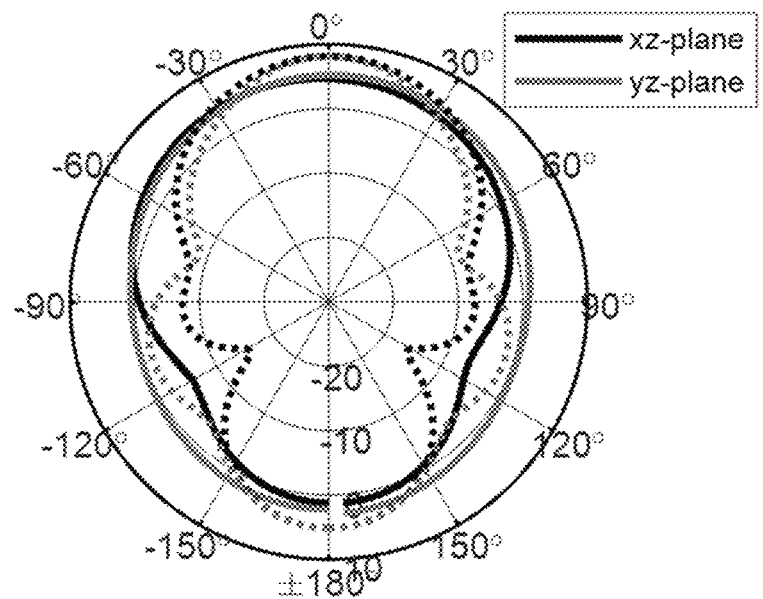
FIG. 13B is a graph showing measured realized gain pattern of the antenna in free space (solid line) and simulated realized gain pattern in the presence of dry soil (dotted line) in xz and yz-planes at 200 MHz.
Figure 13C:
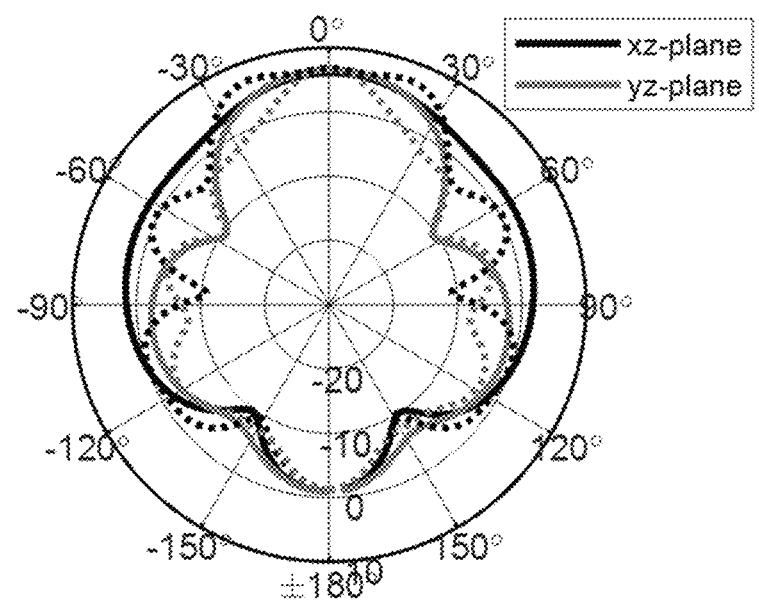
FIG. 13C is a graph showing measured realized gain pattern of the antenna in free space (solid line) and simulated realized gain pattern in the presence of dry soil (dotted line) in xz and yz-planes at 400 MHz.

FIG. 13A shows the measured and simulated realized gain of the antenna in free space and simulated realized gain in the presence of dry soil. Simulation results show that the antenna provides larger realized gain in presence of dry soil at frequencies less than 400 MHz and its simulated realized gain is more than 4.9 dBi within the range 140-510 MHz. FIGS. 13B and 13C show the measured realized gain patterns in free space and simulated realized gain patterns (in xz and yz-planes) in the presence of dry soil at 200 and 400 MHz, respectively. According to the results, the antenna provides higher gain in presence of dry soil per design and its pattern is directive with the main lobe normal to the ground plane.

Figure 14A:
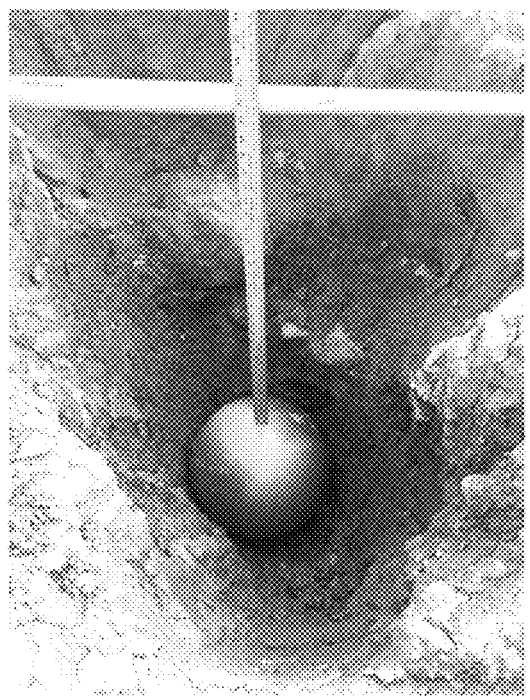
FIG. 14A depicts a metallic sphere buried at the depth of 0.9 m.
Figure 14B:
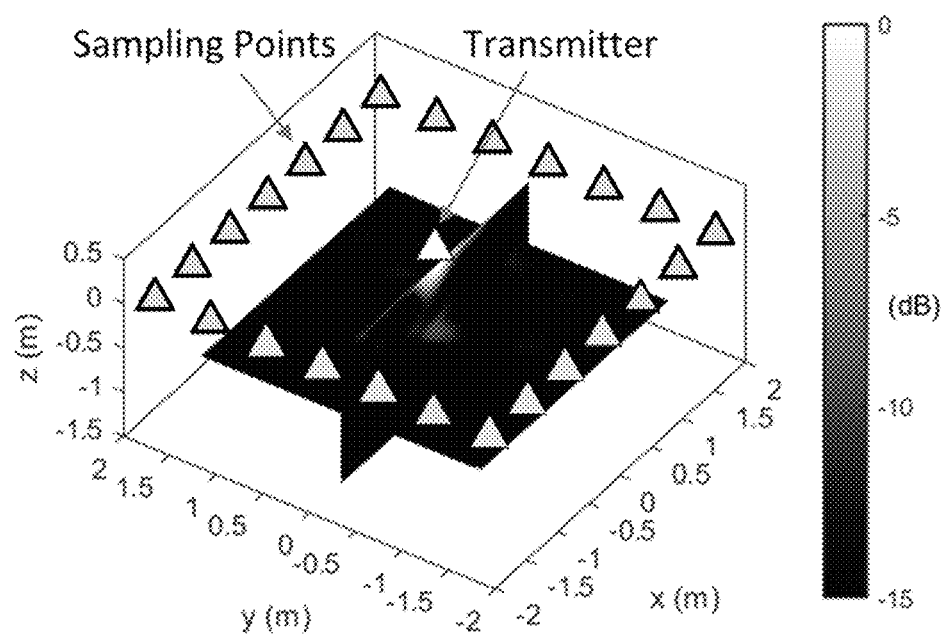
FIG. 14B depicts imaging result in dB.

To evaluate performance of the proposed imaging technique in a real scenario, a field measurement is performed in which a metallic sphere with radius of 18 cm is buried at depth of 0.9 m in Michigan's dense soil as shown in FIG. 14A. Using the antenna designed for imaging system for both transmitter and receiver and a portable vector network analyzer (VNA), the scattered fields are measured over the band 150-450 MHz at 24 sampling points uniformly distributed on a square with sides of 4 m (the circular profile for sampling points locations is replaced by a rectangular profile to simplify the positioning of the antennas). FIG. 14B shows the result of applying (1) to the measured data assuming constant complex permittivity of 4-j0.5 for the soil. It can be observed that the sphere is clearly imaged at the depth of −0.7 m which is the location of the most top part of the sphere.

Figure 15:
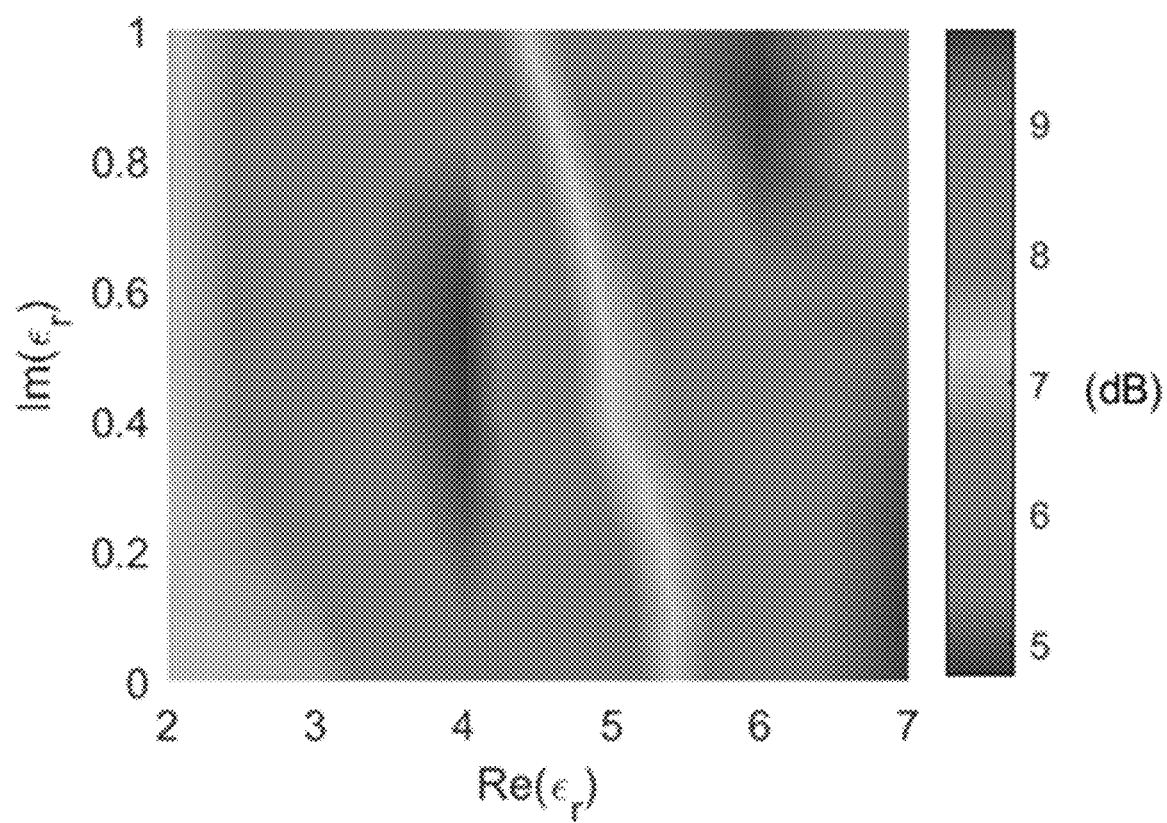
FIG. 15 is a graph showing peak to average value of the image in the range −0.5 m<x<0.5 m and −1 m<z<−0.3 m at y=0 plane versus real and imaginary part of the soil permittivity.

FIG. 15 shows the peak to average value of the image in the range −0.5 m<x<0.5 m and −1 m<z<−0.3 m at y=0 plane versus real and imaginary part of the soil permittivity assuming one-layer soil model. According to the results, the complex permittivity of 4-j0.5 provides the highest peak to average value (highest contrast) in the image. Considering the obtained value as the real soil permittivity, the formed image in FIG. 14B provides the exact location of the object.

Figure 16:
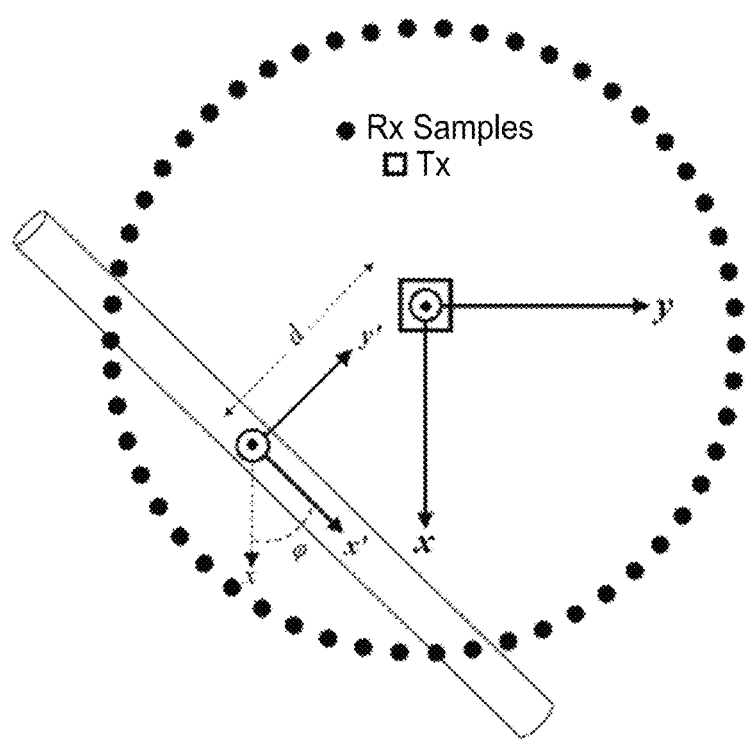
FIG. 16 is a top view of the proposed imaging system with a buried pipeline shown.
Figure 17:
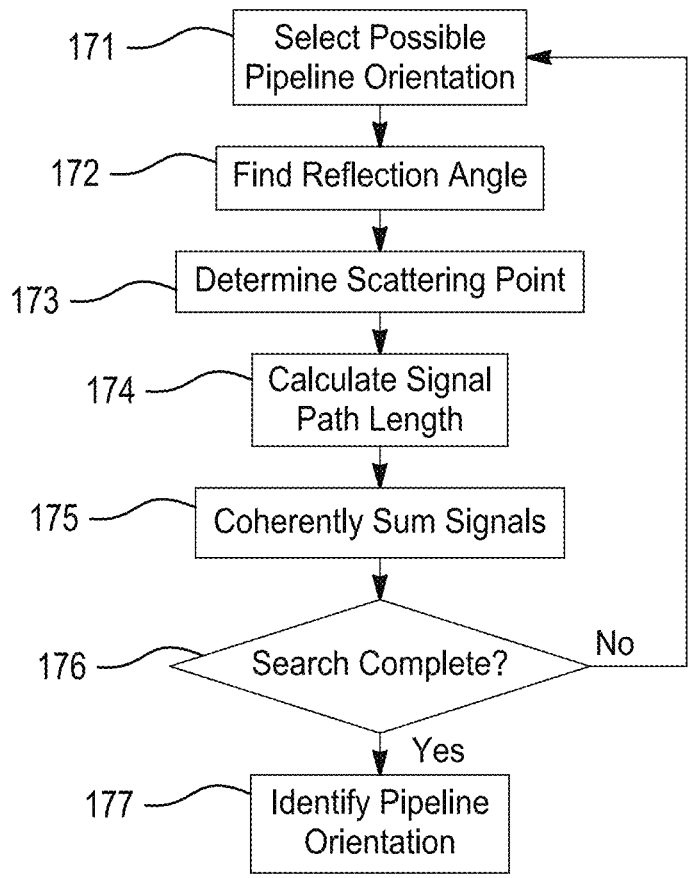
FIG. 17 is a flowchart illustrates steps for detecting the location of a pipeline.

This technique for imaging subsurfaces can be extended to detecting buried pipelines or other cylindrical shaped objects as described in relation to FIGS. 16 and 17. FIG. 16 is a top view of the proposed imaging system 20 described above. To simplify the analysis, the pipeline 161 and the antennas are assumed to be in a homogenous medium. The primed (pipeline) coordinates are rotated by go and displaced by d with respect to a global coordinate system. There is a transmitter (Tx) at the center of the global coordinates, a receiver (Rx) that samples the scattered field on a circle centered at Tx, and a possible pipeline located at depth h from (Tx, Rx) and oriented along x'-axis and displaced at a distance d along y'-axis from Tx.

Similar to the method described above, an ultra-wideband (UWB) signal is transmitted into the ground by the transmitter. The receiver is in turn moved in a predetermined pattern or path along the top surface of the ground and around the transmitter. While the receiver is moving along the predetermined path, signals scattered by objects in the ground are received at a series of sampling points along the path. Additionally, the relative position of the transmitter in relation to the receiver is determined at each of the sampling points in the series of sampling points. Lastly, the location of the pipeline is determined based in part on the signals received by the receiver at each of the sampling points. This technique for determine the location of the pipeline is further described in relation to FIG. 17.

As a starting point, a possible pipeline orientation is selected at 171. In an example embodiment, the possible pipeline orientation is expressed as a depth of the pipeline under the ground, a lateral distance between the pipeline and the transmitter, and an angle of the longitudinal axis of the pipeline with respect to the global coordinate system. This possible pipeline orientation is then evaluated as follows.

Figure 18:
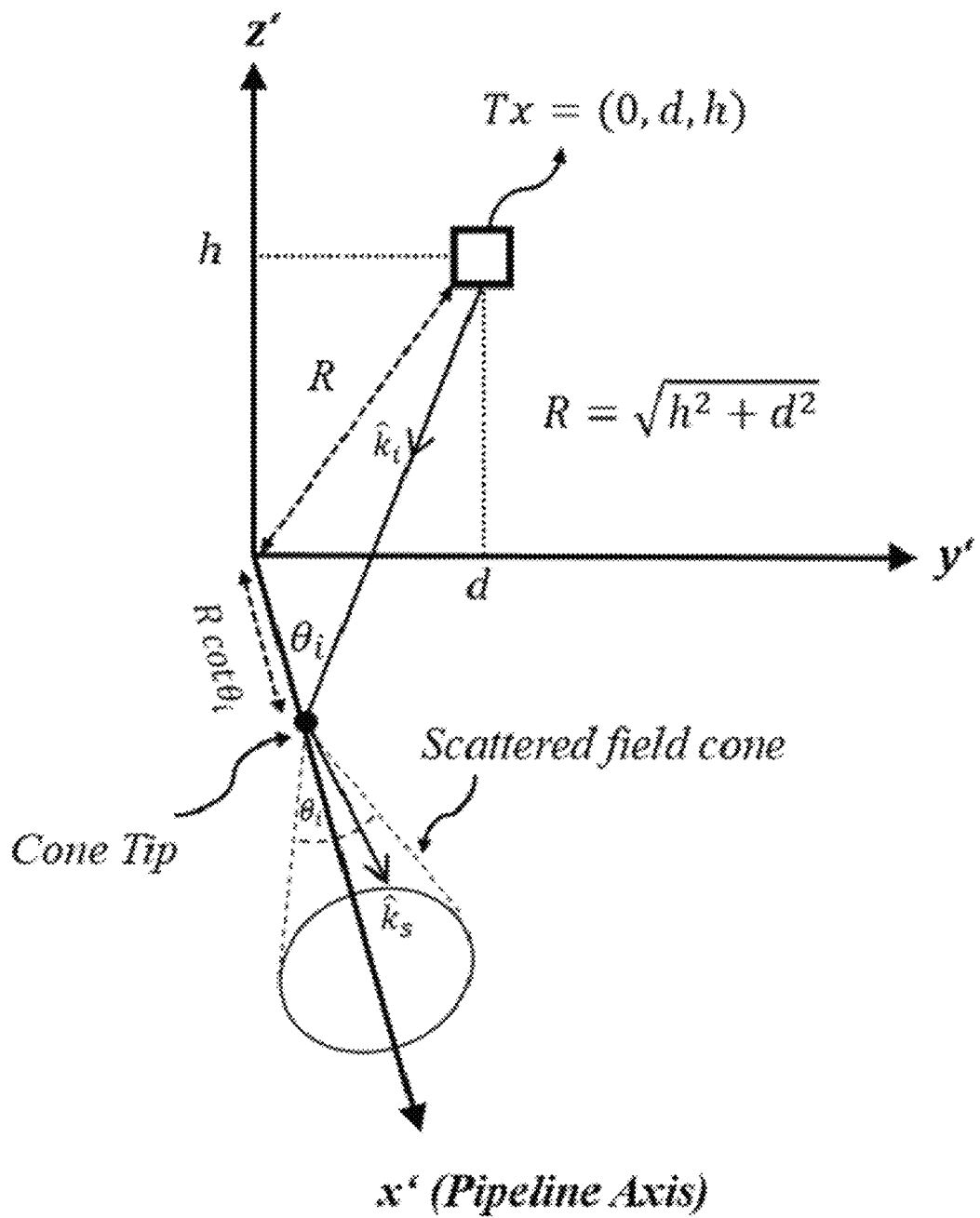
FIG. 18 is a diagram illustrating the scattering as seen in the primed coordinates.

Adopting the primed (or pipeline) coordinates, when the transmitter transmits a wave that hits the pipeline at an angle $\theta_i$, the pipeline will scatter the wave in multiple directions that form a cone whose axis is x'-axis with a generating angle of $\theta_i$ as illustrated by FIG. 18. The equation of the cone formed by the scattered wave vectors is given by:

$$z'^2 + y'^2 = \tan^2\theta_i (x' - R\cot\theta_i)^2 \quad (1)$$

where (R cot $\theta_i$, 0, 0) is the location of the cone tip. At height h, the cone will intersect the plane containing Tx and Rx forming a hyperbola described by:

$$h^2 + y'^2 = \tan^2\theta_i (x' - R\cot\theta_i)^2 \quad (2)$$

For nth Rx sample located at $(x'_{0n}, y'_{0n}, h)$ and excluding the unphysical solution where x' and $\theta_i$ have different signs, there is only a single value of $\theta_i$ that satisfies:

$$h^2 + y'^2_{vn} = \tan^2\theta_i (x'_i - R_{vn}\cot\theta_i)^2 \quad (3)$$

which is given by:

$$\theta_i^n = \tan^{-1}\left(\frac{\sqrt{h^2 + y'^2_{vn}} + R}{x'_{vn}}\right) \quad (4)$$

Given this known geometry, one can find a point along the longitudinal axis of the pipeline at 172, where an incident angle between the longitudinal axis of the pipeline and a line connecting the point to the transmitter is equal to a reflection angle between the longitudinal axis pipeline and a line connecting the point and the receiver.

With a value of this angle, $\theta^n$, one can find the scattering point (phase center) for the nth Rx sample $S^n = (R\cot\theta_n, 0, 0)$ from which one can find the actual bistatic path the signal takes from Tx to $S^n$ to $n^{th}$ Rx sample given by:

$$PathLength(Rx_n) = R_{TX-S^n} + R_{S^n-RX_n} \quad (5)$$

where $$R_{Tx-S^n} = \sqrt{(R\cot\theta_i^n)^2 + R^2} \quad (6)$$

$$R_{Tx-S^n} = \sqrt{(R\cot\theta_i^n - x'_{0n})^2 + y'^2_{0n} + h^2} \quad (7)$$

That is, the scattering point, Sn, on the pipeline can be determined at 173 using the reflection angle. A signal path length between the transmitter and the receiver is then calculated as indicated at 174. These three steps are repeated for each sampling point in the series of sampling points acquired by the receiver.

Signals received from each of the sampling point in the series of sampling points are coherently summed at 175. The signal received at each sampling point can include signal transmitted at one or more different frequencies. Mathematically, this step is as follows:

$$\text{Search}(\varphi, h, d) = \sum_{freq=m}\sum_{n} V_{mn} e^{jk_m[PathLength(Rx_n)]} \quad (8)$$

where $V_{mn}$ is the voltage across receiver terminals at $n^{th}$ sampling point and $m^{th}$ frequency, and $k_m$ is propagation constant at $m^{th}$ frequency. Before the summing, the received signals can be compensated for phase. Knowing all the path lengths for all sampling points for a cylinder with parameters ($\varphi$, h, d), the phase associated with the propagation is calculated and removed from the received signals.

To determine the actual pipeline position, a plurality of possible pipeline orientations in the imaging area represents a search space. Different techniques for enumerating possible pipeline orientations within the image area are contemplated by this disclosure. Another possible pipeline orientation is selected from the search space and the process is repeated as indicated at 176.

Once all of the possible pipeline orientations have been evaluated, the actual pipeline position can be determined at 177. Specifically, the pipeline position is identified as the possible pipeline orientation having the largest sum from amongst the plurality of possible pipeline orientations. In the case one pipeline is in the search space, the sum will have a maximum at the actual orientation ($\varphi$, h, d) of the pipeline. In the case more than one pipeline could be in the search space, a pipeline is identified in each instance where the coherent sum exceeds a predefined threshold. Although the derivation is for a homogenous medium, it can be easily extended to a half-space scenario by applying Snell's law twice and finding $\theta_i$ value that satisfy Snell's law and passes through the hyperbola in (2) reaching Rx.

To test the effectiveness of the pipeline detection method, HFSS simulation software is used in data generation. The simulation scenario includes a pipe that has a 7.5 cm radius and 4 meter length located at 1.1 m depth below (Tx, Rx) level, oriented 45 degrees from global x-axis and displaced 0.5 m from Tx along y'-axis. Tx is in the center of the global coordinates and Rx samples the field at 46 points distributed uniformly on a circle of 1.5 meter radius centered at Tx. The frequency range considered is 150 MHz to 450 MHz with 10 MHz frequency step. The antenna used for both Tx and Rx is an array of two Hertzian dipoles perpendicular to each other with a 90 phase shift to provide circular polarization that is optimal for a pipeline with arbitrary orientation. To check the validity of the phase compensation scheme, the phase of the Rx voltage extracted form HFSS (excluding the Tx–Rx direct signal) is compared with the phase calculated using (5). Mathematically:

$$\text{Calc\_Phase} = -k_m \cdot \text{PathLength}(\varphi=45, h=1.1, d=0.5, Rx_n) \quad (9)$$

$$\text{HFSS\_Phase} = \text{Phase}(V_{min}) \quad (10)$$

The phase comparison results are shown in FIGS. 19A-19C. There is a very good agreement in the phase behavior at all Rx positions across different frequencies which validates the phase compensation scheme.

Figure 20:
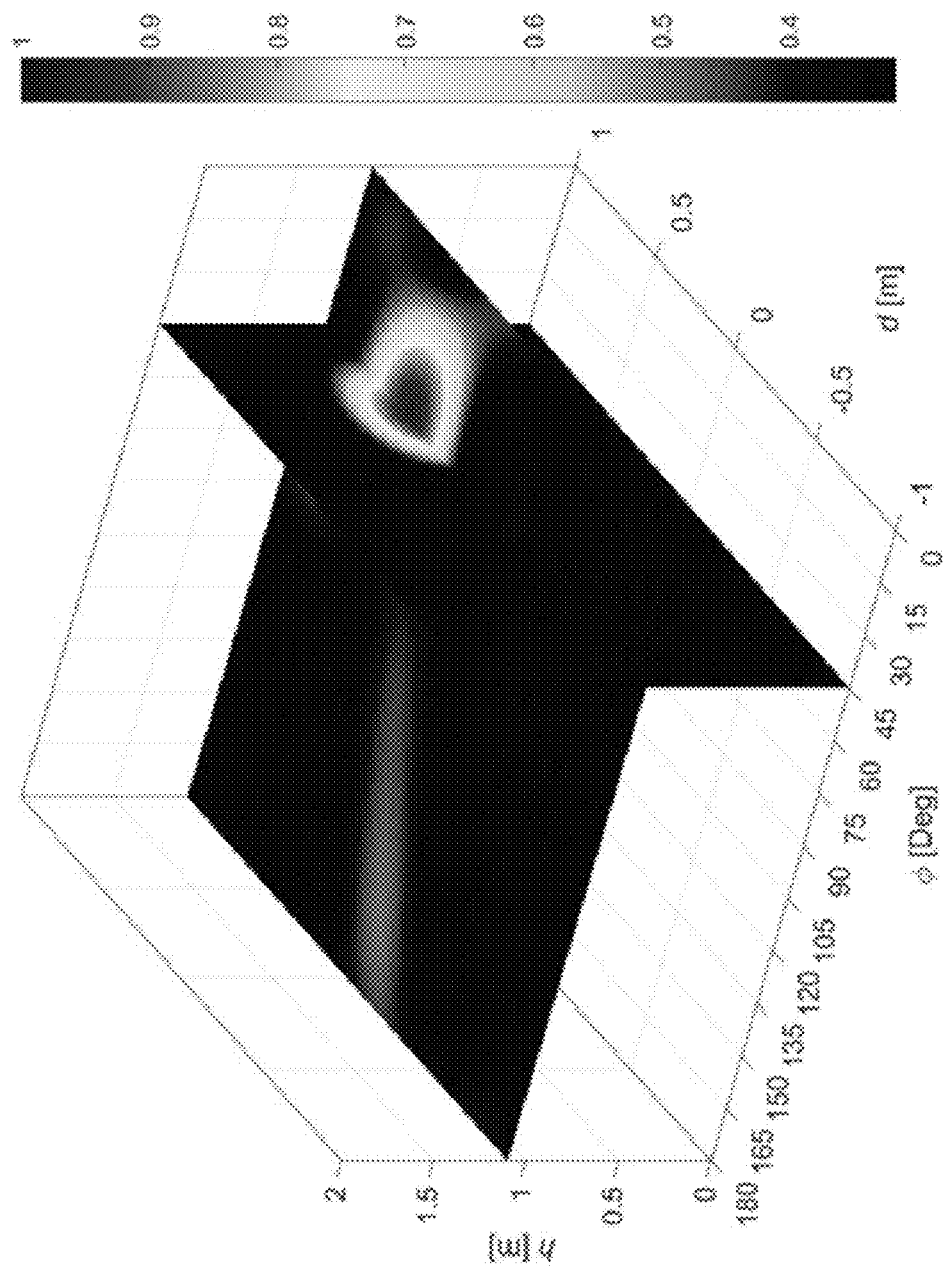
FIG. 20 is a graph depicting two plane cut of the imaging space with all possible values of d, d, and φ.

After validating the phase compensation scheme, the formula in (8) is used to extract the pipeline parameters. FIG. 20 shows two-planes cut in the search space of all possible combinations of (φ, h, d). This plot shows a maximum around the correct pipeline parameters and low value otherwise as predicted by the method.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for subsurface imaging, comprising:
   transmitting, by at least one transmitter, an ultra-wideband (UWB) signal into the ground, where the transmitter is located within an imaging area defined on a top surface of the ground;
   moving, by a vehicle, at least one receiver in a predetermined pattern around the transmitter and along the top surface of the ground;
   receiving, by least one receiver, a signal scattered by an object in the ground at a series of sampling points along the predetermined pattern;
   determining, by an image processor, relative position of the transmitter to the at least one receiver at each sampling point in the series of sampling points; and
   generating, by the image processor, an image of the object from the signals received at each sampling point and corresponding relative position of the transmitter to the at least one receiver at each sampling point.

2. The method of claim 1 further comprises transmitting the UWB signal with a frequency in range of 150-450 MHz.

3. The method of claim 1 further comprises moving the at least one receiver in a series of almost concentric circular paths with different diameters around the at least one transmitter.

4. The method of claim 1 further comprises receiving signals scattered by the object using two or more receivers, each receiver moved along the predetermined pattern by a different vehicle.

5. The method of claim 1 further comprises determining relative position of the transmitter to the at least one receiver using a camera on a flying vehicle or a scanning LIDAR on one of the at least one transmitters, or using differential GPS.

6. The method of claim 1 further comprises generating an image of the object using a frequency-domain backprojection method.

7. The method of claim 1 further comprises generating an image of the object at different subsurface points as follows $$l(r)=\Sigma_{m=1}^{M}\Sigma_{n=1}^{N}S_{mn}\Pi_{l=0}^{L}e^{jlm(\gamma_{nl})(r_i^l+r_r^l)}$$

where N is frequency steps, M is sampling point, L is number of material layers between the top surface of the ground and the object, $\gamma_{nl}$ is complex propagation constant for lth layer at nth frequency step and $S_{mn}$ is frequency response obtained at nth frequency step and mth sampling point.

8. The method of claim 7 further comprises estimating the complex propagation constant for a given layer by estimating permittivity of the given layer and modifying the permittivity to sharpen the image.

9. The method of claim 1 further comprises simultaneously transmitting a UWB signal into the ground from two or more transmitters located in the imaging area and applying fast Fourier transform to extract phase and amplitude of signals corresponding to each of the two or more transmitters, where each of the UWB signals are transmitted at different frequencies from the two or more transmitters.

10. A method for subsurface imaging, comprising:
transmitting a plurality of ultra-wideband (UWB) signals into the ground from a plurality of transmitters, where each UWB signal in the plurality of UWB signals is transmitted at a different frequency;
receiving, by a receiver, a signal scattered by an object in the ground at a series of sampling points while moving along a top surface of the ground in a predetermined pattern around the plurality of transmitters;
applying, by an image processor, a fast Fourier transform to the signals received by the receiver from the plurality of transmitters,
determining, by an image processor, relative position of the receiver to the plurality of transmitters at each sampling point in the series of sampling points; and
generating, by the image processor, an image of the object from the signals received at each sampling point and corresponding relative position of the receiver to the plurality of transmitters at each sampling point.

11. The method of claim 10 further comprises transmitting the UWB signal with a frequency in range of 150-450 MHz.

12. The method of claim 10 further comprises moving the receiver in a series of almost concentric circular paths with different diameters around the plurality of transmitters.

13. The method of claim 10 further comprises determining relative position of the receiver to the plurality of transmitters using a camera on a flying object or a scanning LIDAR on one of the transmitters.

14. The method of claim 10 further comprises generating an image of the object using a frequency-domain backprojection method.

15. The method of claim 10 further comprises generating an image of the object at different subsurface points as follows $$l(r)=\Sigma_{m=1}^{M}\Sigma_{n=1}^{N}S_{mn}\Pi_{l=0}^{L}e^{jlm(\gamma_{nl})(r_i^l+r_r^l)}$$

where N is frequency steps, M is sampling point, L is number of material layers between the top surface of the ground and the object, $\gamma_{nl}$ is complex propagation constant for lth layer at nth frequency step and $S_{mn}$ is frequency response obtained at nth frequency step and mth sampling point.

16. Wherein the transmitter includes a transverse electromagnetic horn antenna.

17. The method of claim 16 wherein the transverse electromagnetic horn antenna includes a first antenna element comprised of a first exponential taper section extending between a first feed point on a ground plane and a first shorting plate, where the first shorting plate is spatially separated from and parallel with the ground plane.

18. The method of claim 17 wherein the transverse electromagnetic horn antenna further includes a second antenna element in a side-by-side arrangement with the first antenna element, the second antenna element is comprised of a second exponential taper section extending between a second feed point on a ground plane and a second shorting plate, such that second exponential taper section expands outwardly from the second feed point in a direction opposite from the direction in which the first exponential taper section expands from the first feed point.

19. The method of claim 18 wherein the transverse electromagnetic horn antenna is configured to be impedance matched to the ground plane.

20. A method for imaging a subsurface pipeline, comprising:
defining a global coordinate system with a transmitter located at an origin of the global coordinate system;
transmitting, by the transmitter, an ultra-wideband (UWB) signal into the ground adjacent to the transmitter;
receiving, by a moving receiver, a signal scattered by a pipeline in the ground at a series of sampling points while moving the receiver in a predetermined pattern around the transmitter;
determining position of the transmitter and position of the receiver at each sampling point in the series of sampling points; and
determining location of a pipeline by:
a) selecting a possible pipeline orientation, where the possible pipeline orientation is expressed as a depth under the ground, a lateral distance from the transmitter and an angle of a longitudinal axis of the pipeline with respect to the global coordinate system;
b) for each sampling point in the series of sampling points, find a point along the longitudinal axis of the pipeline where an incident angle between the longitudinal axis of the pipeline and a line connecting the point to the transmitter is equal to a reflection angle between the longitudinal axis pipeline and a line connecting the point and the receiver;
c) for each sampling point in the series of sampling points, determining a scattering point on the pipeline using the reflection angle;
d) for each sampling point in the series of sampling points, calculating a signal path length between the transmitter and the at least one receiver;
e) coherently adding signals received at each of the sampling points in the series of sampling points;
f) repeating steps a)-e) for a plurality of possible pipeline orientations in the imaging area; and
g) identifying a pipeline in the imaging area when the coherent sum for the possible pipeline orientation is above a prescribed threshold.

* * * * *

UNITED STATES PATENT AND TRADEMARK OFFICE
CERTIFICATE OF CORRECTION

PATENT NO. : 11,579,278 B2
APPLICATION NO. : 16/910259
DATED : February 14, 2023
INVENTOR(S) : Kamal Sarabandi et al.

It is certified that error appears in the above-identified patent and that said Letters Patent is hereby corrected as shown below:

In the Claims

At Column 14, Claim number 1, Line number 46, before "least", insert --at--.

At Column 15, Claim number 7, Lines 8-9, delete

" $I(r) = \sum_{m=1}^{M} \sum_{n=1} S_{mn} \prod_{l=0}^{L} e^{jlm(\gamma_{nl})(r_l^t + r_l^r)}$ " and insert -- $I(r) = \sum_{m=1}^{M} \sum_{n=1}^{N} S_{mn} \prod_{l=0}^{L} e^{jlm(\gamma_{nl})(r_l^t + r_l^r)}$ --.

At Column 15, Claim number 15, Lines 61-62, delete

" $I(r) = \sum_{m=1}^{M} \sum_{n=1} S_{mn} \prod_{l=0}^{L} e^{jlm(\gamma_{nl})(r_l^t + r_l^r)}$ " and insert -- $I(r) = \sum_{m=1}^{M} \sum_{n=1}^{N} S_{mn} \prod_{l=0}^{L} e^{jlm(\gamma_{nl})(r_l^t + r_l^r)}$ --.

At Column 16, Claim number 16, Line 4, delete "Wherein" and insert --The method of claim 1 wherein--.

Signed and Sealed this
Twelfth Day of September, 2023

*Katherine Kelly Vidal*

Katherine Kelly Vidal
*Director of the United States Patent and Trademark Office*